US008554948B2

(12) United States Patent
Van Der Merwe et al.

(10) Patent No.: US 8,554,948 B2
(45) Date of Patent: Oct. 8, 2013

(54) METHODS, SYSTEMS AND COMPUTER PROGRAM PRODUCTS FOR IDENTIFYING TRAFFIC ON THE INTERNET USING COMMUNITIES OF INTEREST

(75) Inventors: Jacobus Van Der Merwe, New Providence, NJ (US); Minaxi Gupta, Bloomington, IN (US); Andrew Kalafut, Bloomington, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 771 days.

(21) Appl. No.: 12/716,420

(22) Filed: Mar. 3, 2010

(65) Prior Publication Data
US 2011/0219445 A1    Sep. 8, 2011

(51) Int. Cl.
G06F 15/173 (2006.01)
H04L 12/26 (2006.01)
H04J 3/16 (2006.01)
G06F 11/00 (2006.01)

(52) U.S. Cl.
USPC ........... 709/240; 709/224; 370/235; 370/468; 726/22

(58) Field of Classification Search
USPC .............. 709/224, 240; 370/235, 468; 726/22
See application file for complete search history.

(56) References Cited

U.S. PATENT DOCUMENTS

| | | | | |
|---|---|---|---|---|
| 6,091,709 | A * | 7/2000 | Harrison et al. | 370/235 |
| 6,240,096 | B1 * | 5/2001 | Book | 370/412 |
| 2004/0128317 | A1 * | 7/2004 | Sull et al. | 707/104.1 |
| 2004/0190448 | A1 * | 9/2004 | Fishteyn et al. | 370/229 |
| 2006/0064411 | A1 * | 3/2006 | Gross et al. | 707/3 |
| 2007/0014266 | A1 * | 1/2007 | Kondo | 370/337 |
| 2007/0041401 | A1 * | 2/2007 | Kaneda et al. | 370/468 |
| 2009/0313026 | A1 * | 12/2009 | Coffman et al. | 704/275 |
| 2010/0131835 | A1 * | 5/2010 | Kumar et al. | 715/205 |
| 2010/0142447 | A1 * | 6/2010 | Schlicht et al. | 370/328 |
| 2010/0154057 | A1 * | 6/2010 | Ko et al. | 726/23 |
| 2010/0299431 | A1 * | 11/2010 | Vanderhook et al. | 709/224 |
| 2012/0131187 | A1 * | 5/2012 | Cancel et al. | 709/224 |

OTHER PUBLICATIONS

Aiello et al., "Analysis of Communities of Interest in Data Networks," in *Proc. PAM Workshop*, Mar. 2005.
Anderson et al., "Mouse trapping: A flow data reduction method," in *Proc. International Conference on Internet Monitoring and Protection*, 2008.
Ballani et al., "Off by default!" in *Proc. ACM HotNets Workshop*, Nov. 2005.
Blake et al., "An architecture for differentiated services," IETF RFC 2475, Dec. 1998.
Brakmo et al., "TCP Vegas: New Techniques for Congestion Detection and Avoidance," in *Proc. ACM SIGCOMM*, London, England, Aug. 1994.

(Continued)

*Primary Examiner* — David Lazaro
*Assistant Examiner* — Vitali Korobov
(74) *Attorney, Agent, or Firm* — Myers Bigel Sibley & Sajovec

(57) ABSTRACT

Methods for identifying wanted traffic on the Internet are provided. The methods include determining a traffic history for a user of the Internet; identifying wanted traffic in a stream of Internet traffic based on the determined traffic history; and prioritizing the identified wanted traffic such that unwanted traffic is assigned a lower priority than the wanted traffic. Related systems and computer program products are also provided.

14 Claims, 22 Drawing Sheets

TABLE II
AVERAGE % OF FLOWS CORRECTLY CLASSIFIED BY COIS BASED ON APPLYING EACH HEURISTIC TO 30 DAYS OF NETFLOW

| HEURISTIC | % CORRECTLY CLASSIFIED |
|---|---|
| NON-RECENT HISTORY | 80.5% |
| RECENT HISTORY | 79.1% |
| REVERSE FLOW | 78.4% |
| LOW PORT | 74.3% |
| PACKET COUNT | 60.9% |
| NO HEURISTIC | 60.9% |

(56) References Cited

OTHER PUBLICATIONS

Chou et al., "Minimizing collateral damage by proactive surge protection," in *SIGCOMM Workshop on Large Scale Attack Defense (LSAD)*, Aug. 2007.
Cisco Systems, "Traffic anomaly detector and guard," www.cisco.com.
Cortes et al., "Communities of interest," *Intelligent Data Analysis*, vol. 6, No. 3, pp. 211-219, 2002.
Cranor et al., "Gigascope: a stream database for network applications," in *ACM SIGMOD*, 2003.
Duffield et al., "Properties and prediction of flow statistics from sampled packet streams," in *Proc. ACM SIGCOMM Internet Measurement Workshop*, Marseille, France, Nov. 2002, pp. 159-171.
El-Gendy et al., "Evolution of the Internet QoS and support for soft real-time applications," *Proceedings of the IEEE*, vol. 91, No. 7, pp. 1086-1104, Jul. 2003.
Floyd et al., "Random Early Detection Gateways for Congestion Avoidance," *IEEE/ACM Transactions on Networking*, vol. 1, No. 4, Aug. 1993.
Floyd S., "TCP and Explicit Congestion Notification," *ACM Computer Communications Review*, vol. 24, No. 5, Oct. 1994.
Ioannidis et al., "Implementing Pushback: Router-Based Defense Against DDoS Attacks," in *Proc. Network and Distributed System Security Symposium (NDSS)*, San Diego, CA, Feb. 2002.
Juniper Networks, "Policy framework configuration guide," www.juniper.net.
Kandula et al., "Botz-4-Sale: Surviving Organized DDoS Attacks That Mimic Flash Crowds," in *Proc. 2nd USENIX NSDI*, Boston, MA, May 2005.
Karasaridis et al., "Wide-scale botnet detection and characterization," in *Conference on Hot Topics in Understanding Botnets (HotBots)*, Apr. 2007.
Mao et al., "Analyzing large ddos attacks using multiple data sources," in *SIGCOMM Workshop on Large Scale Attack Defense (LSAD)*, Sep. 2006.
Marques et al., "Dissemination of flow specification rules," IETF Internet-Draft, Aug. 2005.
McDaniel at al., "Enterprise security: A community of interest based approach," in *Proc. NDSS*, Feb. 2006.
Mirkovic et al., "A taxonomy of DDoS attacks and defense mechanisms," *ACM Computer Communications Review*, vol. 34, No. 2, pp. 39-54, 2004.
Rosen et al., "Multiprotocol label switching architecture," IETF RFC 3031, Jan. 2001.
Sekar et al., "Lads: Large-scale automated ddos detection system," in *USENIX Annual Technical Conference*, Jun. 2006.
Simon et al., "AS-based accountability as a cost-effective DDoS defense," in *Conference on Hot Topics in Understanding Botnets (HotBots)*, Apr. 2007.
Van der Merwe et al., "Dynamic connectivity management with an intelligent route service control point," SIGCOMM Workshop on Internet Network Management (INM), Sep. 2006.
Verkaik et al., "Primed: A community-of-interest-based DDoS mitigation system," in *SIGCOMM Workshop on Large Scale Attack Defense (LSAD)*, Sep. 2006.
Walfish et al., "DDoS defense by offense," in *Proc. ACM SIGCOMM*, Pisa, Italy, Aug. 2006.
Xiao et al., "Internet QoS: A big picture," *IEEE Network*, vol. 13, No. 2, pp. 8-18, Mar./Apr. 1999. [24] C. Systems, "Cisco ios quality of service solutions configuration guide," www.cisco.com.
Yaar et al., "Pi: A path identification mechanism to defend against DDoS attacks," in *Proc. IEEE Symposium on Security and Privacy*, Oakland, CA, 2003.
Yaar et al., "SIFF: A stateless Internet flow filter to mitigate DDoS flooding attacks," in *Proc. IEEE Symposium on Security and Privacy*, Oakland, CA, May 2004.
Mirkovic et al., "Internet Denial of Service, Attack and Defense Mechanisms," Prentice Hall Professional Technical Reference, 2005, pp. 61-99.

* cited by examiner

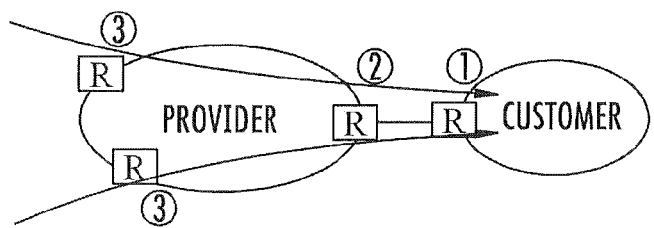

FIGURE 1

TABLE I
BASIC STATISTICS FOR EACH DATA SET (TRAFFIC TO SINGLE PREFIX)

|  | SAMPLED | UNSAMPLED GOOD | UNSAMPLED FULL |
|---|---|---|---|
| NUMBER OF FLOWS | 14,249 | 982,000 | 3,762,631 |
| NUMBER OF PACKETS | 105,397 | 128,519,734 | 173,766,564 |
| TRAFFIC VOLUME | 143 MB | 133.2 GB | 190.0 GB |
| NUMBER OF IPS | 962 | 11,332 | 63,653 |
| NUMBER OF /24S | 691 | 19,324 | 49,473 |

FIGURE 2

TABLE II
AVERAGE % OF FLOWS CORRECTLY CLASSIFIED BY COIS BASED ON
APPLYING EACH HEURISTIC TO 30 DAYS OF NETFLOW

| HEURISTIC | % CORRECTLY CLASSIFIED |
|---|---|
| NON-RECENT HISTORY | 80.5% |
| RECENT HISTORY | 79.1% |
| REVERSE FLOW | 78.4% |
| LOW PORT | 74.3% |
| PACKET COUNT | 60.9% |
| NO HEURISTIC | 60.9% |

FIGURE 3

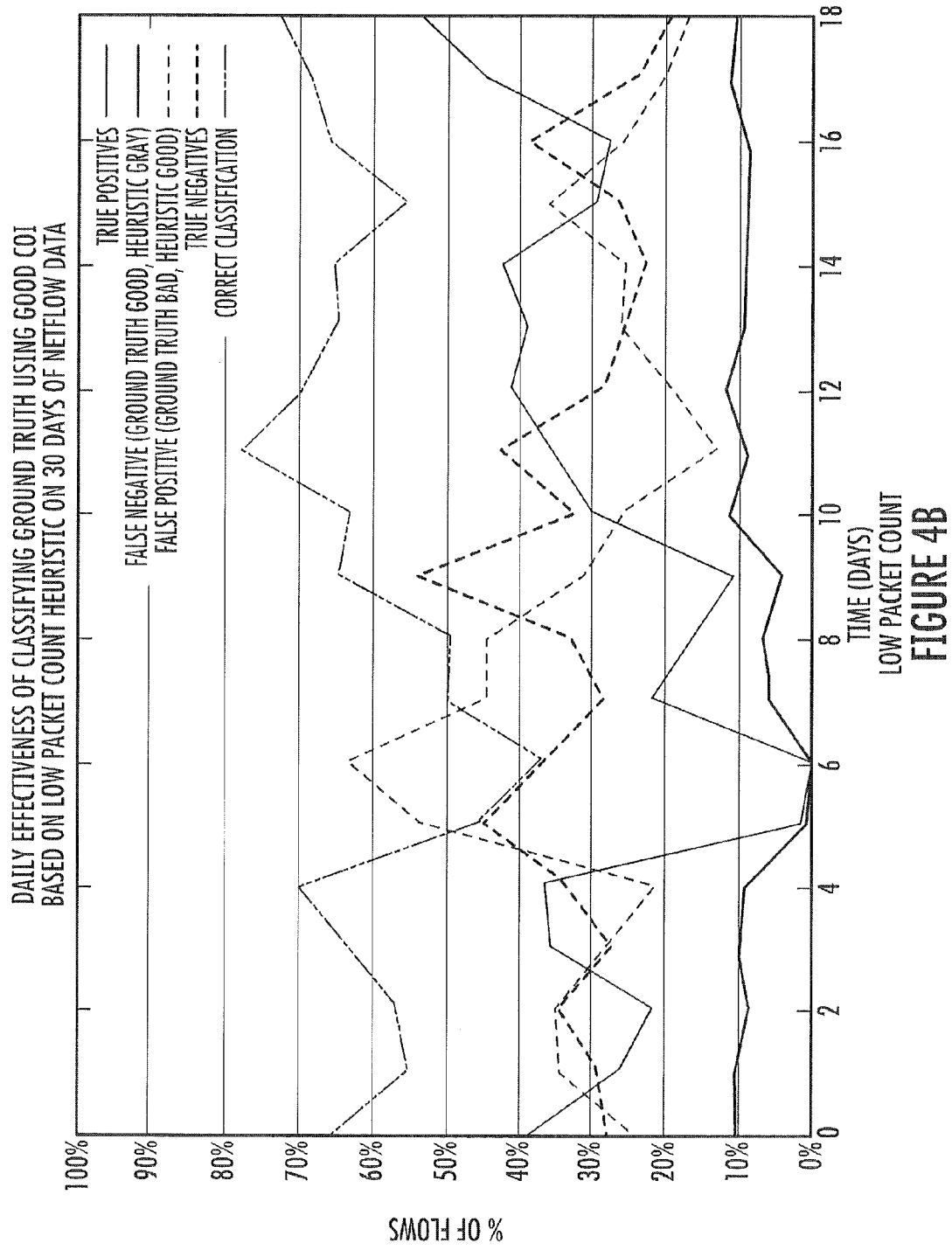

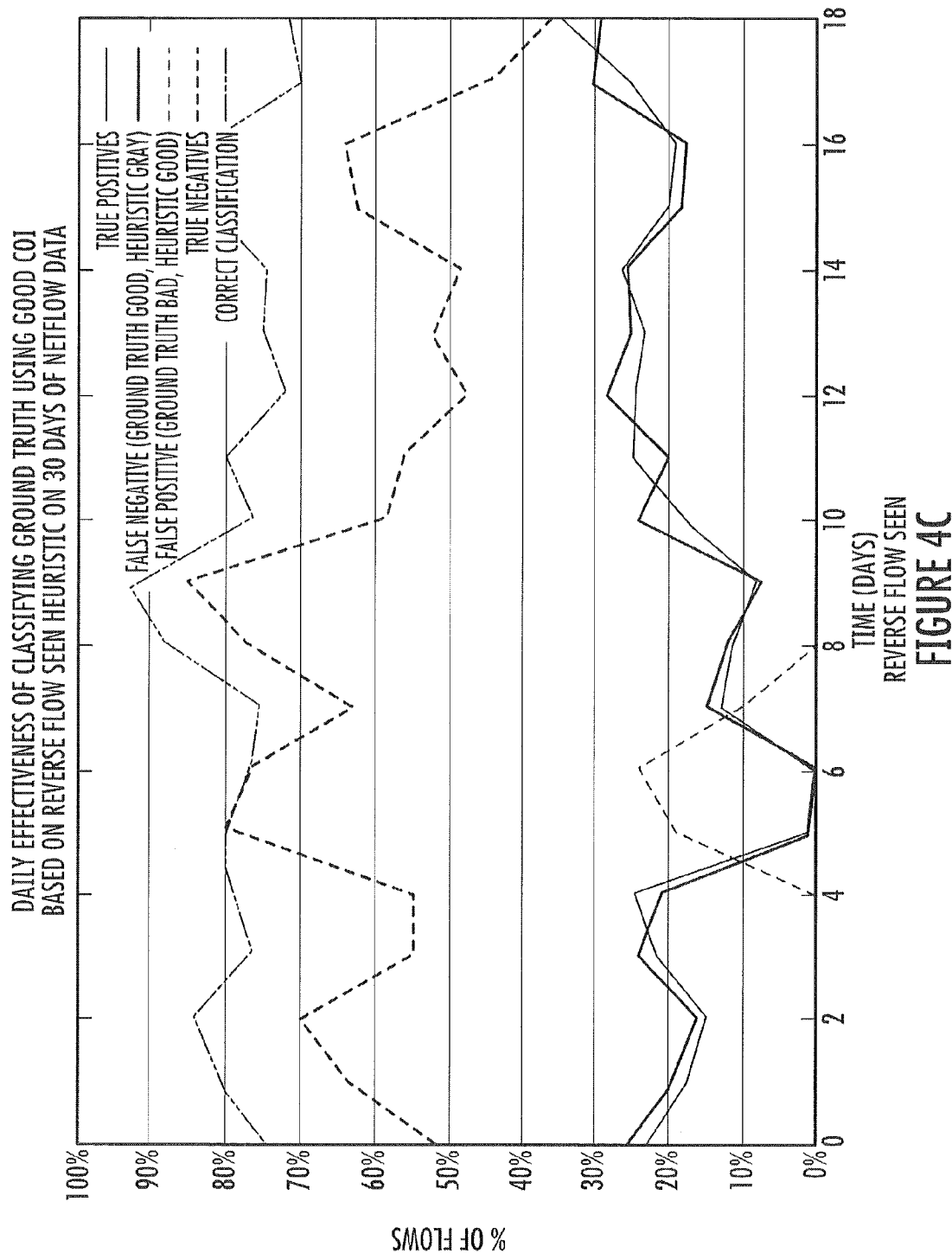

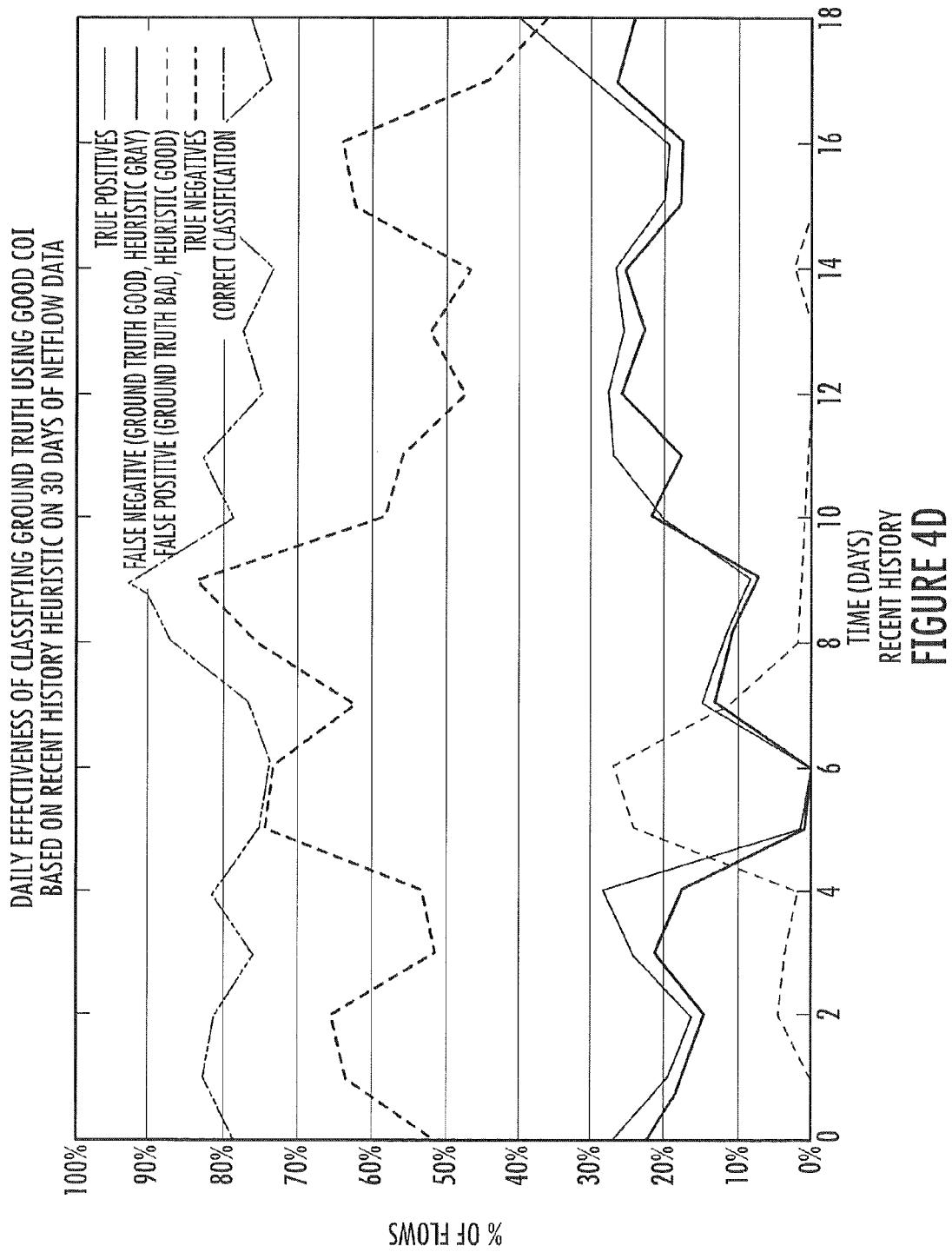

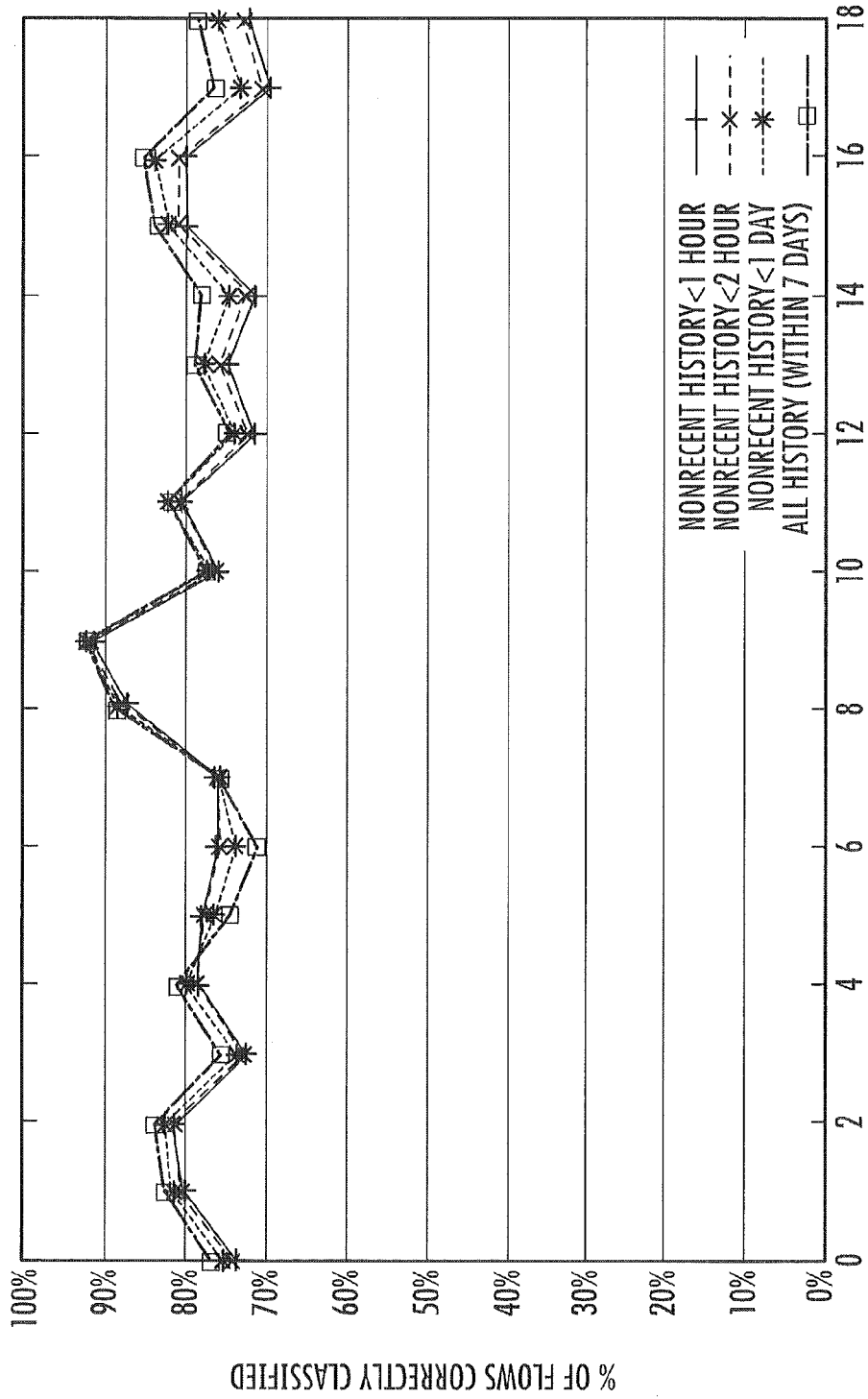

_US 8,554,948 B2_

METHODS, SYSTEMS AND COMPUTER PROGRAM PRODUCTS FOR IDENTIFYING TRAFFIC ON THE INTERNET USING COMMUNITIES OF INTEREST

BACKGROUND

The present application relates generally to Internet communications, and, more particularly, to methods, systems, and computer program products for identifying traffic on the Internet.

The Internet can be a very useful tool for obtaining all kinds of information. However, the information being sought might be obscured by unwanted and unsolicited traffic sent to an Internet user. In other words, Internet traffic is a mixture of wanted and unwanted traffic, i.e., the Internet exists because it provides utility in the form of wanted/useful communication. However, the open architecture of the Internet also allows lots of unwanted traffic in the form of SPAM, Distributed Denial of Service (DDoS) attacks, Phishing and the like. Most approaches to dealing with unwanted traffic attempt to identify unwanted traffic so that it can be filtered out. This may be difficult as the sources of unwanted traffic change continually.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments provide methods for identifying wanted traffic on the Internet. The methods include determining a traffic history for a user of the Internet; identifying wanted traffic in a stream of Internet traffic based on the determined traffic history; and prioritizing the identified wanted traffic such that unwanted traffic is assigned a lower priority than the wanted traffic.

In further embodiments, determining a traffic history may include obtaining historical information from an internet service provider (ISP) about the user; and constructing a community of interest (COI) for the user from the obtained historical information about the user.

In still further embodiments, the historical information obtained from the ISP comprises Netflow data.

In some embodiments, constructing a community of interest may include defining at least one heuristic; determining flows in the stream of internet traffic that represent wanted traffic; and modifying the COI for the user to include the endpoints of the flows determined to include wanted traffic using the defined heuristic. The defined at least one heuristic may include a low port number heuristic, a low packet count heuristic, a reverse flow seen heuristic, a recent history heuristic, a non-recent history heuristic and/or no heuristic.

In further embodiments, the defined at least one heuristic is a combination of at least two heuristics.

In still further embodiments, the stream of Internet traffic may include sampled Netflow data and/or unsampled data.

Although embodiments are discussed primarily above with respect to method embodiments, system and computer program product embodiments are also described herein.

Other systems, methods, and/or computer program products according to embodiments will be or become apparent to one with skill in the art upon review of the following drawings and detailed description. It is intended that all such additional systems, methods, and/or computer program products be included within this description, be within the scope of embodiments, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which:

FIG. 1 is a diagram illustrating traffic differentiation enforcement options in accordance with some embodiments.

FIG. 2 is a table illustrating basic statistics for each data set in accordance with some embodiments.

FIG. 3 is a table illustrating average percentage of flows in accordance with some embodiments.

FIGS. 4A through 4F are graphs illustrating overall effectiveness of good communities of interest (COIs) in accordance with some embodiments.

FIGS. 9A and 9B are graphs illustrating effects of varying parameters for recent history and non-recent history heuristics in accordance with some embodiments.

DETAILED DESCRIPTION OF EMBODIMENTS

Figure 4A:
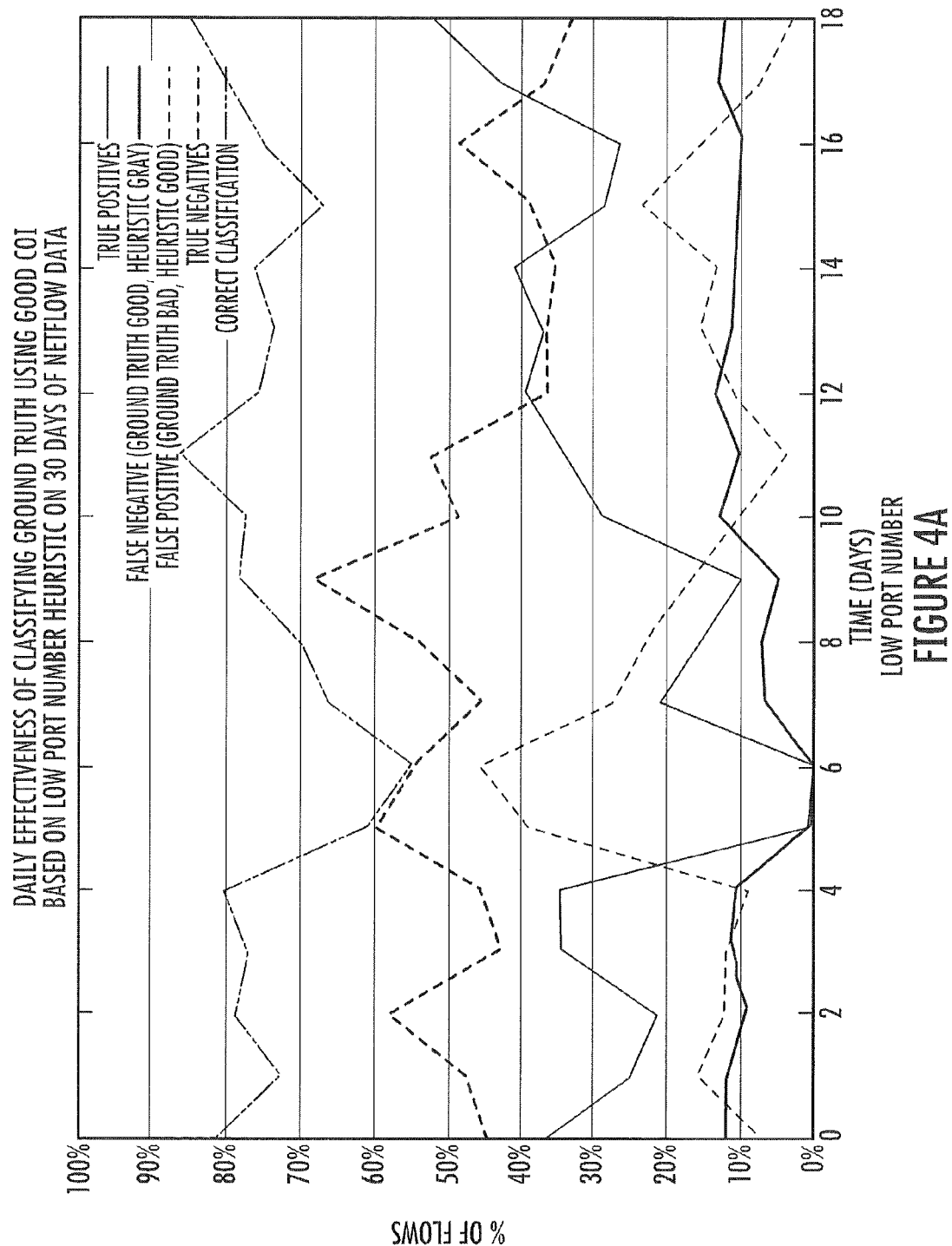
Figure 4E:
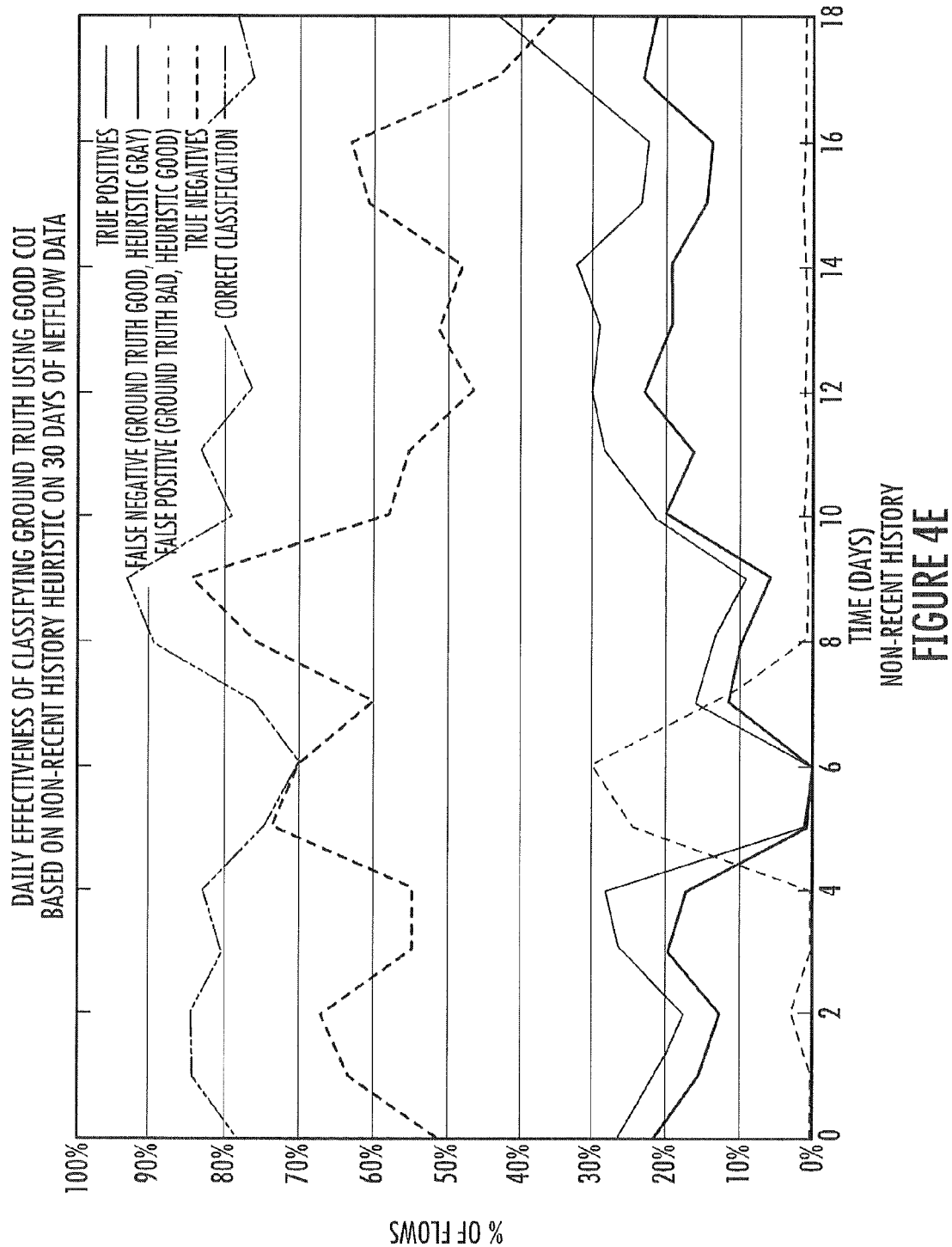
Figure 4F:
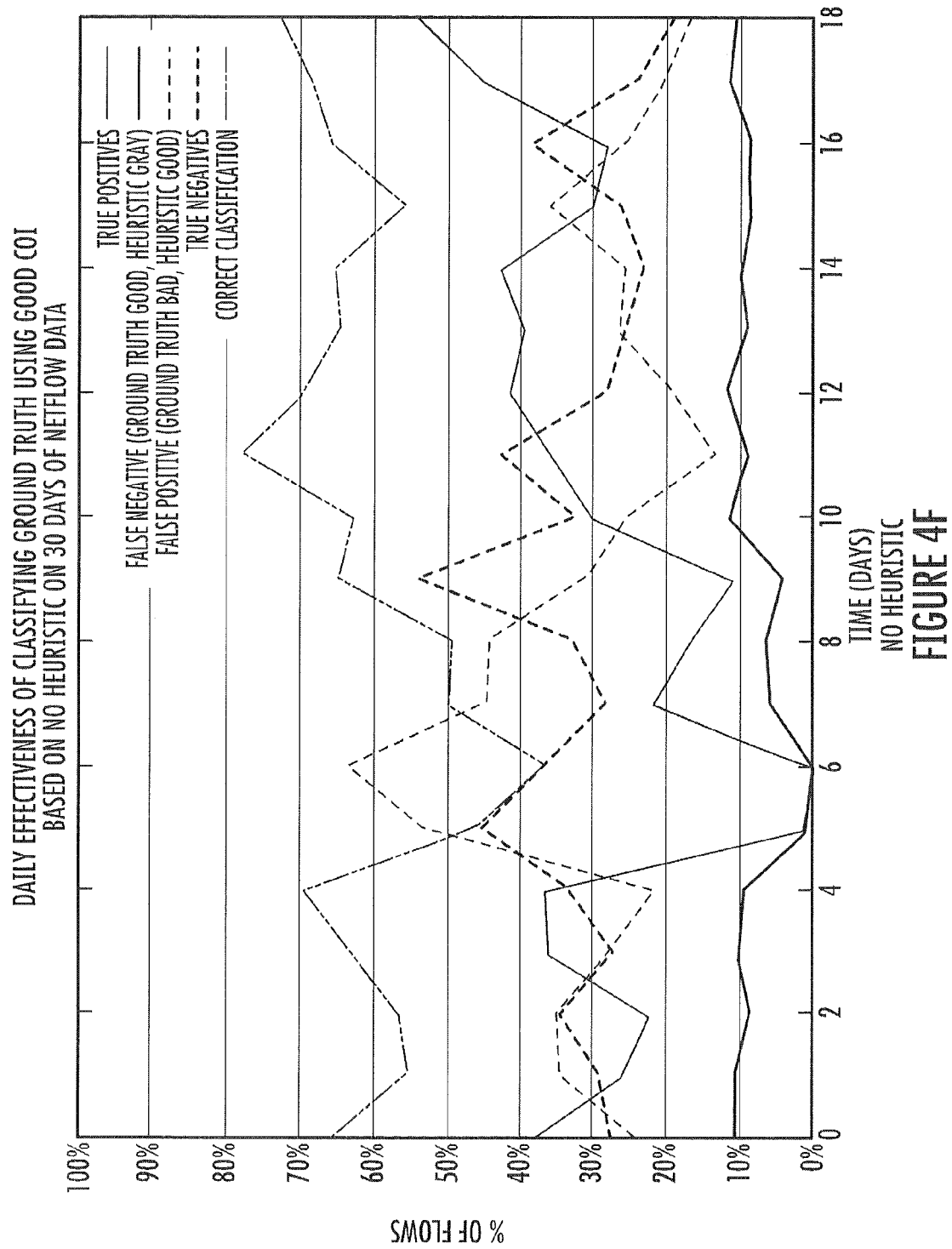

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

As discussed above, identification of unwanted Internet traffic may be a daunting task as sources of the unwanted traffic are continually changing. Unwanted traffic may be classified as, for example, SPAM, Distributed Denial of Service (DDoS) attacks and Phishing and the like. SPAM may be defined as unsolicited email. A DDoS attack may be an attack where multiple compromised systems are used to target a single system causing a denial of Service (DoS) attack. Victims of a DDoS attack consist of both the end targeted system and all systems maliciously used and controlled by the hacker in the distributed attack. Phishing may include attempting to acquire sensitive information, such as usernames, passwords and credit card details, by masquerading as a trustworthy entity in an electronic communication. As is clear, these are all unwanted Internet traffic.

Thus, according to some embodiments, wanted Internet traffic may be identified based on communications that have been historically "wanted communications." As used herein, "wanted communications" or "good communications" refers to information received over the Internet that is not considered SPAM or otherwise unsolicited communications. Furthermore, as used herein "unwanted communications" or "bad communications" refers to unsolicited communications received over the Internet, for example, SPAM. Prioritizing such "wanted communications" according to some embodiments in effect gives lower priority to "unwanted communications", thus possibly protecting a customer in case of, for example, overload conditions. According to some embodiments, an Internet service provider (ISP) may construct a per-customer community of interest (COI) containing entities which have had previous "wanted communications" with the customer. These COIs could then be used in combination with traffic differentiating mechanisms during periods of heavy traffic in order to prioritize traffic from the communicating entities known to be wanted as will be discussed below with respect to FIG. 1 through 17.

Communities of Interest (COI) have been studied to classify traffic within, for example, an enterprise network, and to mitigate DDoS attacks. As discussed herein, COIs may be used to prioritize known "wanted" traffic on the Internet. According to some embodiments, some embodiments construct an effective COI from information which would be available to an ISP about its customers, for example, sampled netflow data. Furthermore, various heuristics are discussed and used to determine which flows in the data actually represent wanted traffic whose endpoint should be inserted into the COI. The heuristics discussed herein may be effective in differentiating "wanted" and "unwanted" traffic according to some embodiments.

The best-effort communication model of the Internet, combined with transport protocols that are congestion aware, and router congestion management mechanisms, have undeniably resulted in a very robust system, capable of supporting a wide variety of services and applications. The Internet's best-effort communication model, however, performs poorly in terms of differentiating the relative importance of traffic, despite the adoption of technologies such as Diff-Serv and MPLS. This deficiency of the Internet is particularly problematic when it comes to differentiating between wanted and unwanted traffic. In particular, the best-effort, unaccounted service model directly enables DoS and DDoS attacks.

Wide recognition of this problem has led to a litany of proposals to extend or redesign the Internet to deal with unwanted traffic and DDoS in particular. However, many of these proposals either provide limited benefits if not universally adopted or might require fundamental changes to Internet protocols. This, in effect, leaves service providers with limited means at their disposal to deal with the ever present DDoS attacks against their customers. Point solutions using detailed traffic analysis provide effective protection, but unfortunately do not scale to the needs of larger service providers. Other commonly deployed mechanisms, such as traffic blackholing, cause collateral damage and further require the detection of an attack before the mitigation can be applied.

A proactive DDoS mitigation strategy, in which the prediction of communication patterns based on historic communication is used to prioritize between wanted and unwanted traffic, recently illustrated promising results. In particular, network derived intelligence can be used to inform the use of existing low-level router mechanisms to perform the actual differentiation.

Thus, some embodiments provide derivation of network intelligence to inform proactive DDoS mitigation. In particular, network intelligence derived from historic sampled Netflow, i.e., data that is readily available to most service providers, can be used to predict future traffic patterns. Thus, some embodiments may be used by, for example, an ISP who might want to provide differentiated Internet Protocol (IP) transport services to its customers based on their historic traffic characteristics. Analysis of ISP customers connecting to a backbone network, where "customers" are enterprise networks or smaller ISPs are discussed herein.

For each of these customer networks, a set of "entities" is derived with which each of these networks engage in "wanted" communication and this set of entities is used to predict future wanted communication. As used herein, "community-of-interest (COI)" refers to a set of communicating entities and further refer to a "wanted COI" as the set of communicating entities engaged in wanted communication.

The details discussed herein according to some embodiments use several data sources providing both breadth and depth at scale. For example, sampled flow records from a tier-1 ISP were used from which COIs can be derived for all customer interfaces on the ISP backbone. Furthermore, two sets of unsampled flow records for one of the customer sites are also used to provide in depth ground truth for our analysis.

Some embodiments provide development of heuristics that can be applied to flow data to derive wanted COIs for Internet traffic; evaluation of these heuristics using ground truth from an enterprise network and showing that the resulting COIs are very effective in predicting wanted traffic and differentiating that from unwanted traffic; and evaluation of the utility of using wanted COIs to predict wanted traffic for ISP customers using a large corpus of Internet data from more than 50,000 ISP customers.

Referring first to FIG. 1, traffic differentiation enforcement options in accordance with some embodiments may be discussed. Some embodiments using existing quality of service (QoS) mechanisms that allow for differentiated treatment of packets. In particular, wanted COIs are constructed to include sets of network prefixes derived from source IP addresses. Traffic matching the wanted COI is assumed to be "wanted" traffic and is given priority over other traffic, for example, by being enqueued in a higher priority queue. Conventional routers support these kinds of mechanisms. For example, router vendors offer products with sophisticated classifiers and policing mechanisms.

As illustrated in FIG. 1, there are three possible places where traffic differentiation may be deployed: 1) Customer Ingress, 2) Provider Egress, and 3) Provider Ingress. It is possible to perform filtering at the customer edge router and get some degree of protection. Because of the brute force nature of many of today's DDoS attacks, however, access links can easily be overwhelmed and filtering on the provider side of the access link may be advantageous. Being able to perform this filtering along the total perimeter of the provider network would of course further reduce the possibility of collateral damage within the provider's network. In this case, a per-customer control requirement implies pushing customer-specific policies to all routers at the perimeter of the network. Some methods would allow for the dissemination of filtering specification in a scalable fashion. Conventional routers are able to deal with the resulting large-scale filtering requirements, however, it is assumed that classification and differentiation will be performed at the provider egress router, thereby protecting customer access links.

Using the inherent structure afforded by COIs to impose structure on communicating entities has been performed in the context of a phone network as well as enterprise data networks. DDoS mitigation work also used COIs derived from Internet data. However, the COI was derived from unsampled flow records which does not offer a scalable solution for deriving COIs for all customers connected to an ISP. Some embodiments discussed herein, apply COIs to Internet traffic. Furthermore, methods exist that make use of both a wanted COI and an unwanted COI representing a set of unwanted communicating entities. Some embodiments discussed herein derive wanted COIs because unwanted traffic might not generally have stable communication patterns and, thus, may not provide significant utility.

Most DDoS mitigation approaches are reactive rather than proactive. Some embodiments discussed herein, may be similar to "off-by-default" approach where an end system explicitly indicates to the network infrastructure what traffic it wants to receive. Rather than explicitly signaling this information to the network, however, in our case the network indirectly derives this information from traffic patterns. Proactive approaches are also known, however, the emphasis is on protecting the network infrastructure by exploiting stability in aggregate traffic flows. In some embodiments discussed herein fine grained per-customer protection is provided by using stability in the communication patterns of enterprise networks.

Some embodiments locate heuristics that when applied to sampled Netflow data on each customer interface of an ISP can extract information about the wanted-COIs for that customer. The ISPs can in turn use these good-COIs to prioritize wanted traffic over unwanted traffic as desired. The basic heuristics tested for their efficacy in identifying wanted flows are discussed. Each heuristic was tested by itself and also in conjunction with other heuristics.

Various heuristics according to some embodiments will be discussed. Low Port Number Heuristic: Low port numbers generally use root access. Even though services on these ports could be compromised, a low port number is in general an indication of a legitimate service. The low port number heuristic leverages this observation to identify wanted flows. This heuristic considers a flow to be "wanted" if either of the port numbers involved in the connection are below 1024.

Low Packet Count Heuristic: This heuristic leverages the fact that most flows on the Internet are short. It checks if a flow has seen five or fewer packets, as measured by sampled Netflow. This translates to approximately 500 or few packets seen due to the 1 in 500 sampling in a primary data set. If a flow passes this test, it is considered to be wanted. Very short flows may be excluded, which may be, for example, port scans, which can not be isolated due to the 1/500 packet sampling rate.

Reverse Flow Seen Heuristic: If a flow in one direction is reciprocated by a flow in the reverse direction, it may be an indication of a two-way connection. While there are cases where a two-way communication does not guarantee that the traffic is wanted, such as SPAM, most of the wanted traffic does have a request-response nature. For each flow, this heuristic checks to see if the flow has been seen between the same pair of IP addresses in the opposite direction within the previous seven days. If it has been seen, the flow is considered to be wanted, otherwise, it is considered to be suspect.

Recent History Heuristic: This heuristic is based on an assumption that frequent communication indicates wanted traffic. For each sending IP address, this heuristic checks if the IP address was seen before in the previous hour. If so, the flow is considered to be wanted.

Non-recent History Heuristic: This heuristic is in the compliment of the recent history heuristic. Like the recent history heuristic, it checks if an IP address has been seen before. However, instead of checking if it was seen in the previous hour, it checks if it was seen in the previous seven days, but not the previous hour. The theory is that most attacks are short-lived, so if an IP has been seen multiple times in flows not close together, it is more likely to be legitimate.

No Heuristic: Where appropriate, the results of using the heuristics are compared with that of not applying any heuristic. This may serve as a baseline to indicate how much of an effect the heuristics may have.

Some embodiment applied the heuristics discussed above to sampled Netflow data available to ISPs. The effectiveness of the various heuristics will now be discussed. Various sources of data will now be discussed.

Sampled Data: The main data set is made up of sampled Netflow data, to which the heuristics are applied Data was collected from over 200 routers on a tier-1 ISP network. The Netflow data contains many pieces of information at flow granularity, including, but not limited to, the start and end times of flows, source and destination IP addresses and ports, the transport layer protocol in use, and the number of packets in the flow. The Netflow data also helps determine the ingress and egress interfaces where the flow enters and leaves the ISPs network. This information is useful in identifying the origin and destination sites for each flow.

The Netflow data may be sampled in two ways. First, the routers do packet sampling at a rate of, for example, 1 in 500. Furthermore, the routers perform smart sampling. Smart sampling is a technique to get a reliable estimate of detailed usage from only a subset of flow records. It exploits the fact that a large fraction of usage is contained in a small fraction of flows. By preferentially sampling larger flows over small ones, one can control the volume of statistics while simultaneously controlling the variance of statistical estimates derived from them. Smart sampling entails balancing those two objectives in an optimal manner.

Unsampled Data: In order to test the efficacy of the heuristics, two unsampled data sets were used. The first, referred to as unsampled good or wanted data, was collected inside of a firewall at one "customer" site. Assuming, that the firewall is accurate and has already filtered out the unwanted flows, this data would serve as a ground truth for testing if the heuristics do a good job of picking good data from sampled Netflow. This data was collected using a Gigascope device and contained good flows to one /16 prefix. The second data set, referred to as unsampled full data, is unsampled data destined to the same customer site but before it was subjected to the firewall. Combined, these two data sets serve as ground truth and provide a full view of all the flows to this customer site and allow us to distinguish good traffic from the rest of the traffic.

Basic statistics for Netflow (sampled), unsampled wanted (good) data, and unsampled full data for the customer site where a detailed analysis was performed will be discussed. In the interest of brevity, information on Netflow data from other customer sites will not be discussed, even though analysis on that data was performed as discussed below. These statistics are presented in Table I of FIG. 2. All numbers presented in the Table I of FIG. 2 are averages per day, over the 19 days the tests were performed.

Each heuristic was tested under various parameters. The analysis presented focuses on a single customer site due to the fact that unsampled ground truth is required for this purpose. A good heuristic would classify wanted Netflow records as wanted (good). Here, effectiveness of individual heuristics is examined. Wanted (good) COIs for each heuristic are built by applying the heuristic to Netflow data for 30 days in a row. Any time the heuristic marks a flow as wanted, we add the /24 containing the IP address of the sender of flow to the wanted COI. Once the wanted COI is built, the following day of ground truth data is applied, checking which flows it classifies as wanted (good) or unwanted (bad) and comparing this to how they were classified in the ground truth data itself. This process is repeated for 19 days of ground truth, building a new wanted COI shifted forward by a day each time.

Referring to Table 2 of FIG. 3, average percent of flows correctly classified by good COIs based on each heuristic will be discussed. As illustrated in FIG. 3, the nonrecent history heuristic performs best overall, and additionally performs best on most days. Recent history heuristic is never the best, but comes close to non-recent in average correctness. The reverse flow heuristic also comes close in averages correctness, although the only days it is the best on are those near the data feed problem. While the low port heuristic is best on some days, its average is significantly less. The packet count heuristic, and no heuristic both do significantly worse than the others.

Referring now to FIGS. 4A through 4F, graphs illustrating the four categories the flows can end up in: true positives (good flows classified as good), true negatives (bad flows classified as bad), false positives (bad flows classified as good), and false negatives (good flows classified as bad) will be discussed. The plots also illustrate combined true positives and true negatives, which is nothing but the total data classified correctly. Some large differences in the graphs illustrated in FIGS. 4A through 4F are observed in both their overall effectiveness and the trade-off between false positives and false negatives. Having low false negatives means for flows that are good, the good COI is unlikely to classify them as being bad. This would be the most important property between false positives and false negatives in situations where the good COI was being used to filter traffic. However, a focus may be on traffic prioritization. In this case, having low false positives may be the more desirable property. Low false positives mean that less bad things are likely to be mistakenly classified as good. If a significant amount of bad traffic would get classified as good, it could use up resources and defeat the purpose of the prioritization scheme.

The good COI based on the reverse flow heuristic (FIG. 4C) produces almost no false positives, aside from near days 5-7, where there is a problem with the Gigascope data feed near this time missing some data. The most it has any other is 0.1%. The recent history (FIG. 4D) and non-recent history (FIG. 4E) heuristics produce slightly more, with maximums of 4.3% and 2.8%. The low port number heuristic (FIG. 4A) produces significantly different results here, with as much as 23.5% of flows being classified as false positives on one day. Using no heuristic (FIG. 4E) or using the low packet count heuristic (FIG. 4B) also produce a large amount of false positives, and additionally do not perform well overall due to the high false positive rate. The low port number heuristic (FIG. 4A), however, also produces significantly less false negatives than the three others which perform well, a maximum of 13.5% in a day while the non-recent history (FIG. 4E), recent history (FIG. 4D), and reverse flow (FIG. 4C) heuristics classified up to 23.0%, 26.2% and 30.5% of flows as false negatives. Using no heuristic (FIG. 4E) or the packet count heuristic (FIG. 4B) does better than the others in terms of false positives. However, their performance overall is not competitive with the others.

Figure 5:
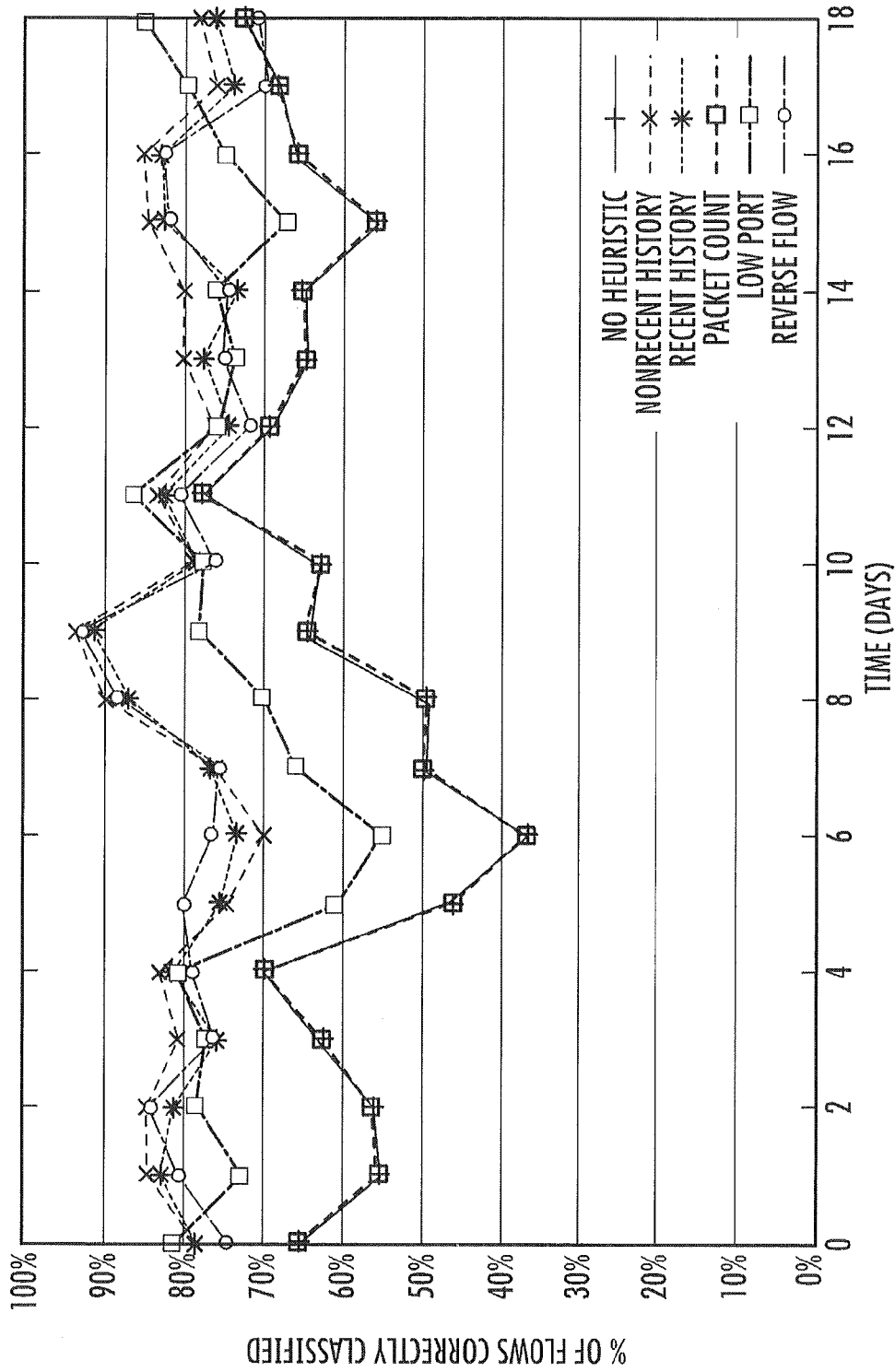
FIG. 5 is a graph illustrating four categories of flows in accordance with some embodiments.

In order to directly compare the heuristics, the percent of flows from each day of ground truth correctly classified by each heuristic is plotted in FIG. 5. As illustrated therein, although there are differences, for the most part, the heuristics perform similarly. The recent history, non-recent history, low port, and reverse flow heuristics classify similar percentages correctly as each other for several days in the data. Each of these heuristics tend to classify correctly significantly more often than no heuristic at all, with the worst of them often correctly classifying 10% more of the flows than no heuristic. The exception to this is the packet count heuristic. While there is a slight difference in its classifications from no heuristic at all, it is so slight that it is not visible on the graph. The effect of this heuristic changes the classification of no more than 0.1% of flows.

The analysis thus far assumed that 30 days of Netflow data was used to construct good COIs. Ideally, it would be best to use as little information as possible without compromising on the accuracy, for this would require less information to be maintained and less processing to build the good COI for each customer interface at the ISP. Some embodiments of discussed herein use varying number of days of Netflow data.

Figure 6:
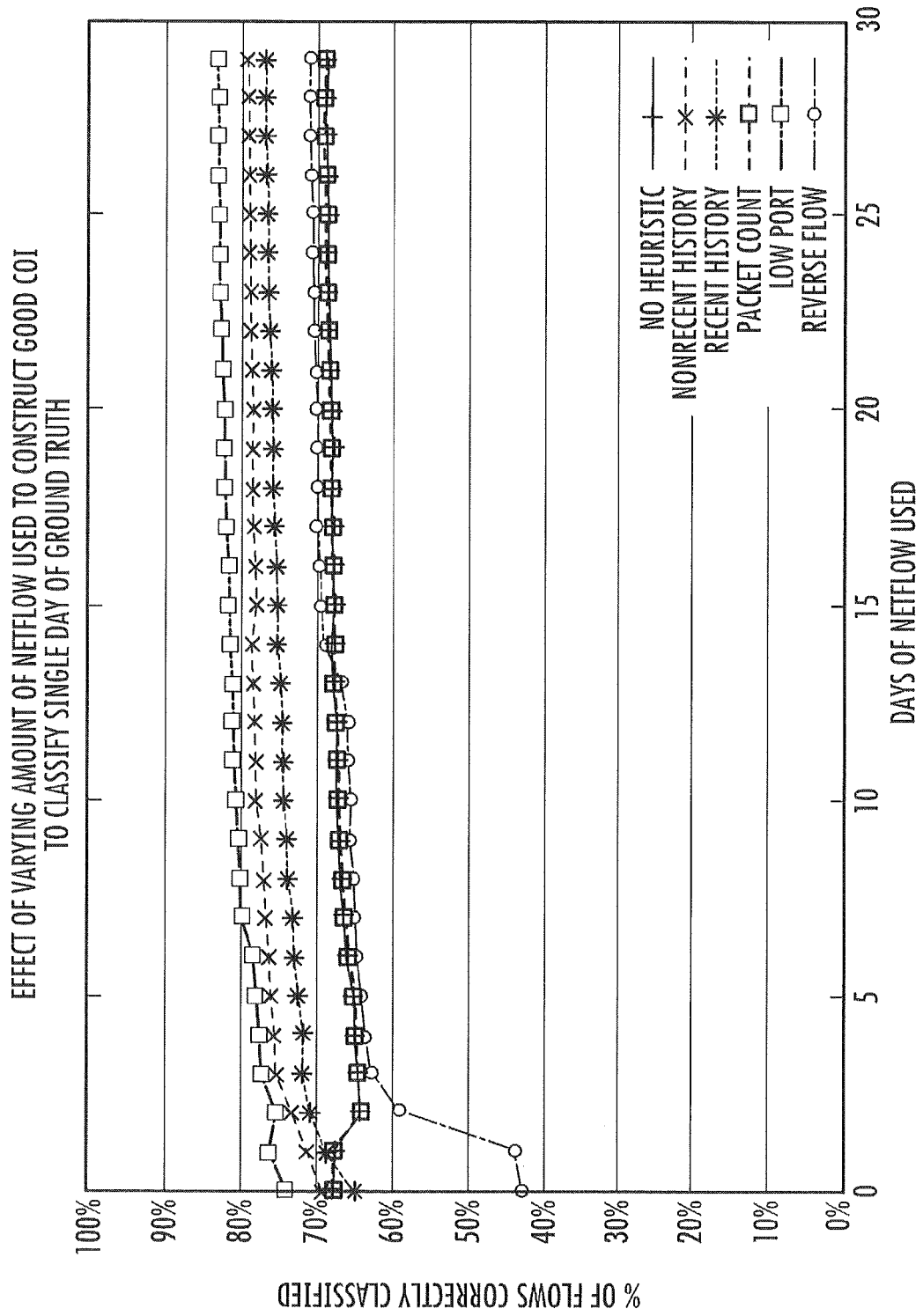
FIG. 6 is a graph illustrating effects of varying number of days of Netflow used to construct COIs in accordance with some embodiments.

Referring now to FIG. 6, the effect of varying the number of days of Netflow data used to construct the good COI that will be used to classify data on day 18 in FIGS. 4 and 5 (the last day in these figures). As illustrated in FIG. 6, similar trends are observed for the low port, non-recent history, and recent history heuristics. The amount classified correctly has a notable increase for the first few days, but near day 5 it levels off having only marginal increases in accuracy per day by the time it gets to day 10. The reverse flow heuristics shows a similar pattern except for a much greater increase in the first few days. This may indicate that at least for the day used here, more than about 10 days worth of history may not provide enough benefit to justify its use. Results from no heuristic, or the packet count heuristic are different. A drop in effectiveness between days 2 and 3 is observed. The drop in true negatives identified here is not made up for by an increase in true positives until several more days are used.

Figure 7:
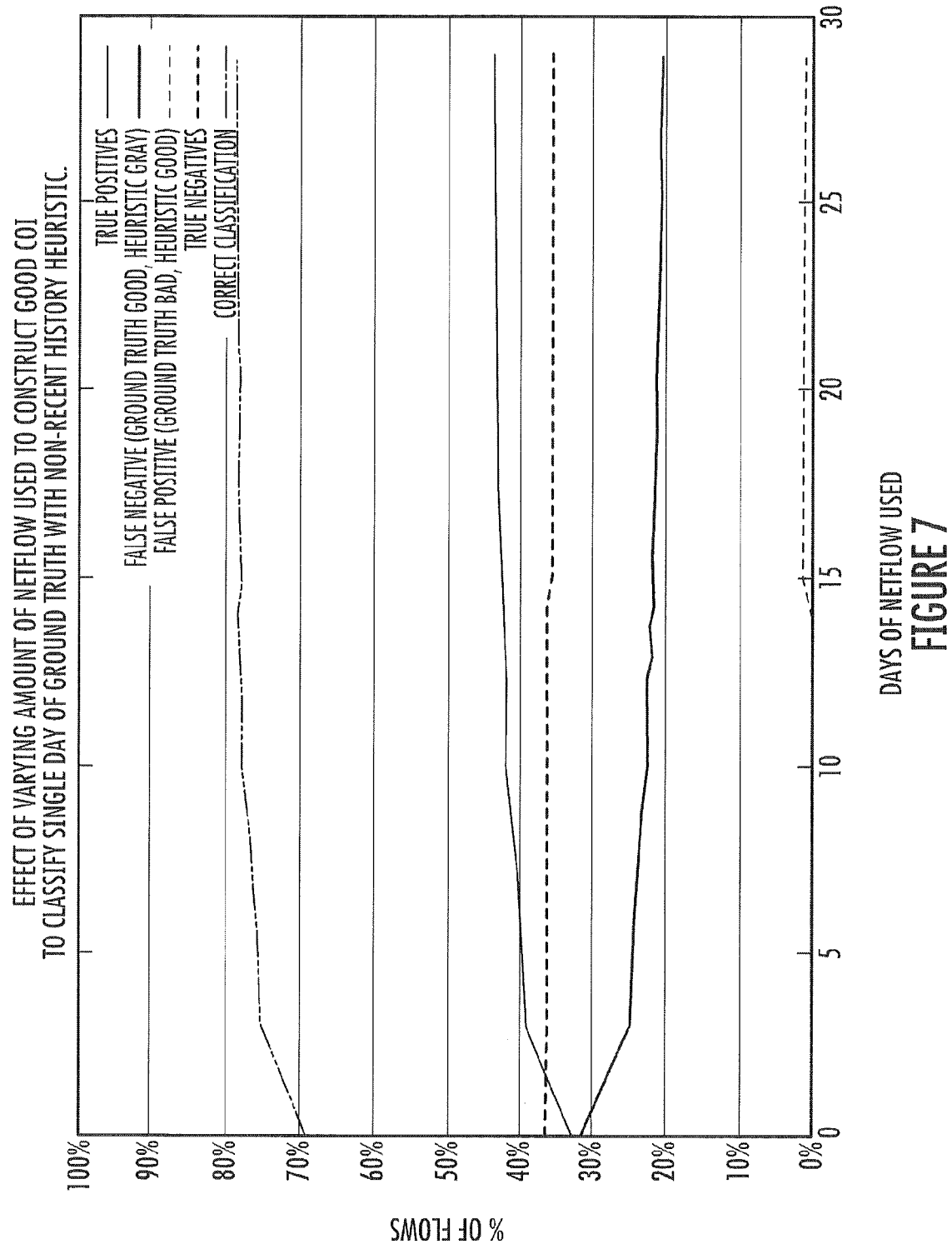
FIG. 7 is a graph illustrating effects of varying number of days of Netflow used to construct good COI on true and false positives and negatives in accordance with some embodiments.

Referring now to FIG. 7, the effect of varying number of days of Netflow used to construct a good COI on true and false positives and negatives in a single heuristic, non-recent history will be discussed. How the true and false positives and negatives change the number of days of Netflow used is varied are similar to FIG. 7 for all heuristics. The percentages of true negatives and false positives show very little change based on how much Netflow is used in most of the heuristics. Most of the benefit from building the good COI from more days of Netflow comes from a decrease in false negatives and the corresponding increase in true positives, which start out with changes of a few percent per day, and quickly turns into more gradual changes, but never really flattens out by the time we get to 30 days. Even looking at the classifications into false positives and negatives, a few days of Netflow is sufficient.

Figure 8A:
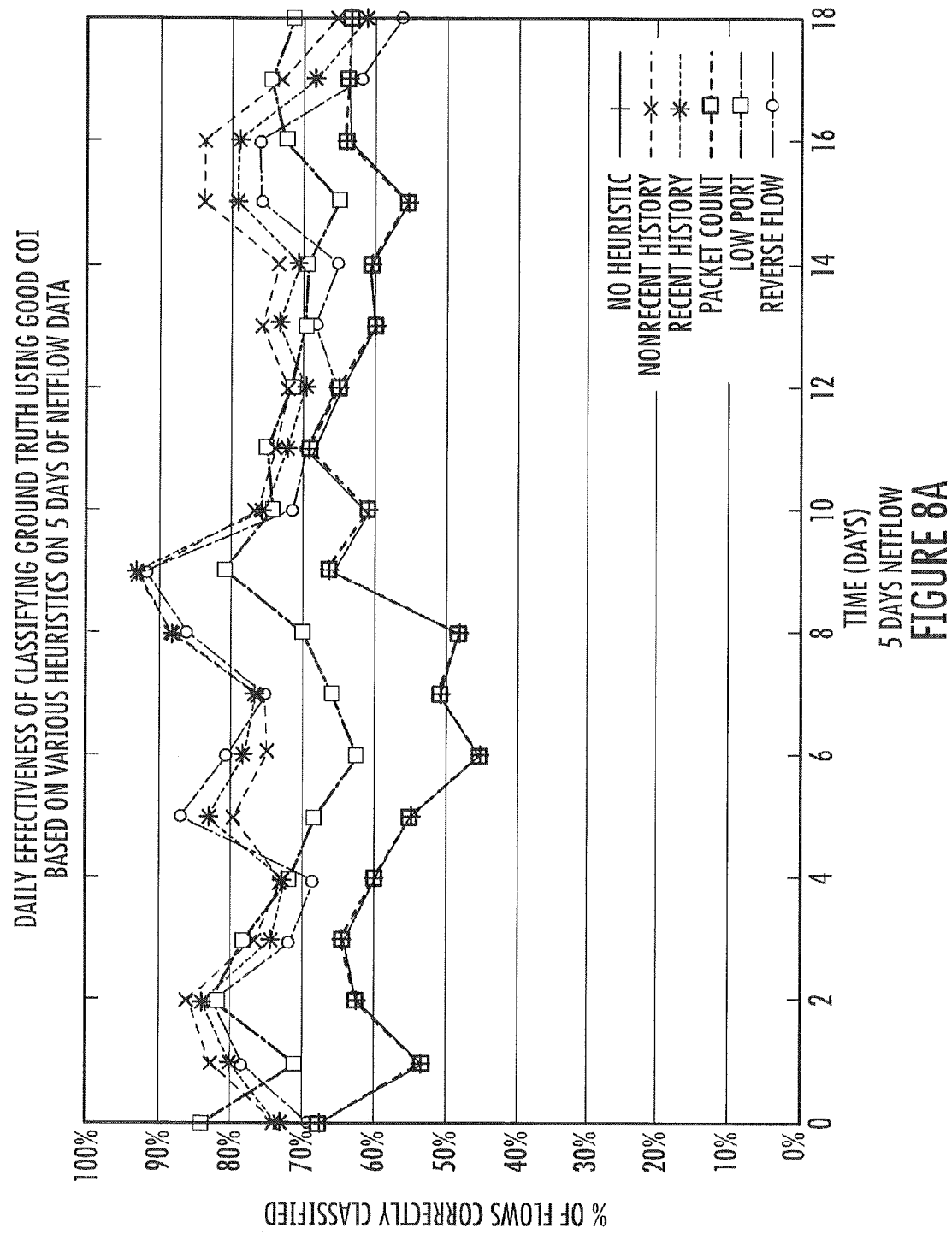
FIGS. 8A and 8B are graphs illustrating effects of varying number of days of Netflow used to construct COIs in accordance with some embodiments.
Figure 8B:
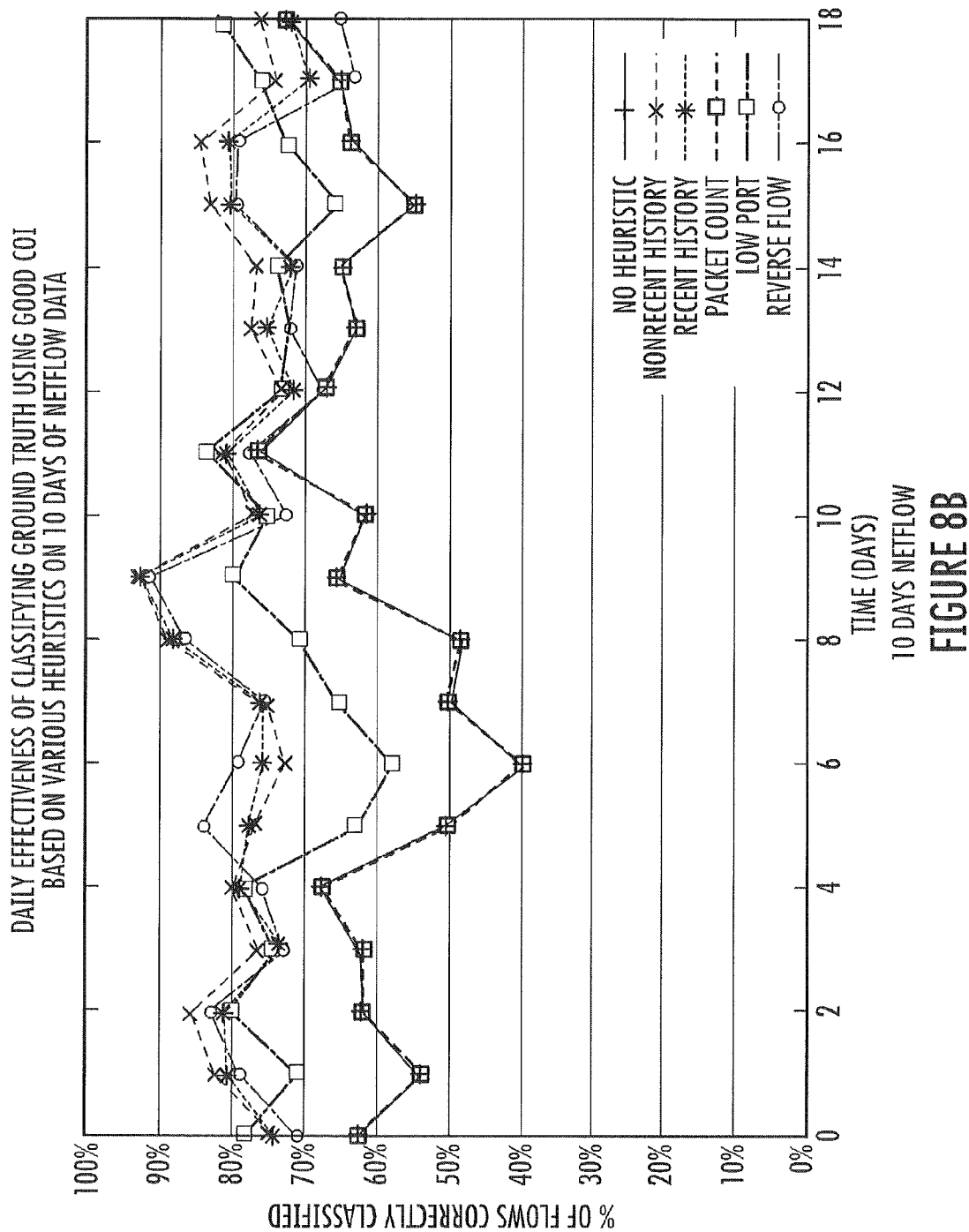

One day of classification is not enough to tell that approximately 10 days of Netflow data is all that is needed. As illustrated in FIG. 8, how much each heuristic classifies correctly when using 5, 10, and 20 days of Netflow to build the good COI will be discussed. These can additionally be compared to FIG. 5 which illustrates the same thing for 30 days of Netflow. Only a small difference can be seen between using 10 days of Netflow, and using 30 day as illustrated in FIG. 5. The difference between 5 and 10 days is greater. There are some days when this difference has almost no effect, such as on days 8 and 9. However, on most days there is an effect. Furthermore, the difference is not always good. While others increase, on day 0 the low port heuristic actually decreases in accuracy when 10 days of Netflow are used instead of 5. Most of the changes though, even for this heuristic, are positive when moving from 5 to 10 days of history. Although there is some variation based on the heuristic and the day being considered, it appears that 10 days of history used to construct the COI produces COIs almost as good as those with 30 days, without requiring as much history to be maintained.

Varying parameters for heuristics in accordance with some embodiments will be discussed. Some of the heuristics discussed above can have variations. For example, the threshold on the packet count heuristic can be changed to a different number of packets. The amount of history considered for the recent history heuristic can be varied.

Figure 9A:
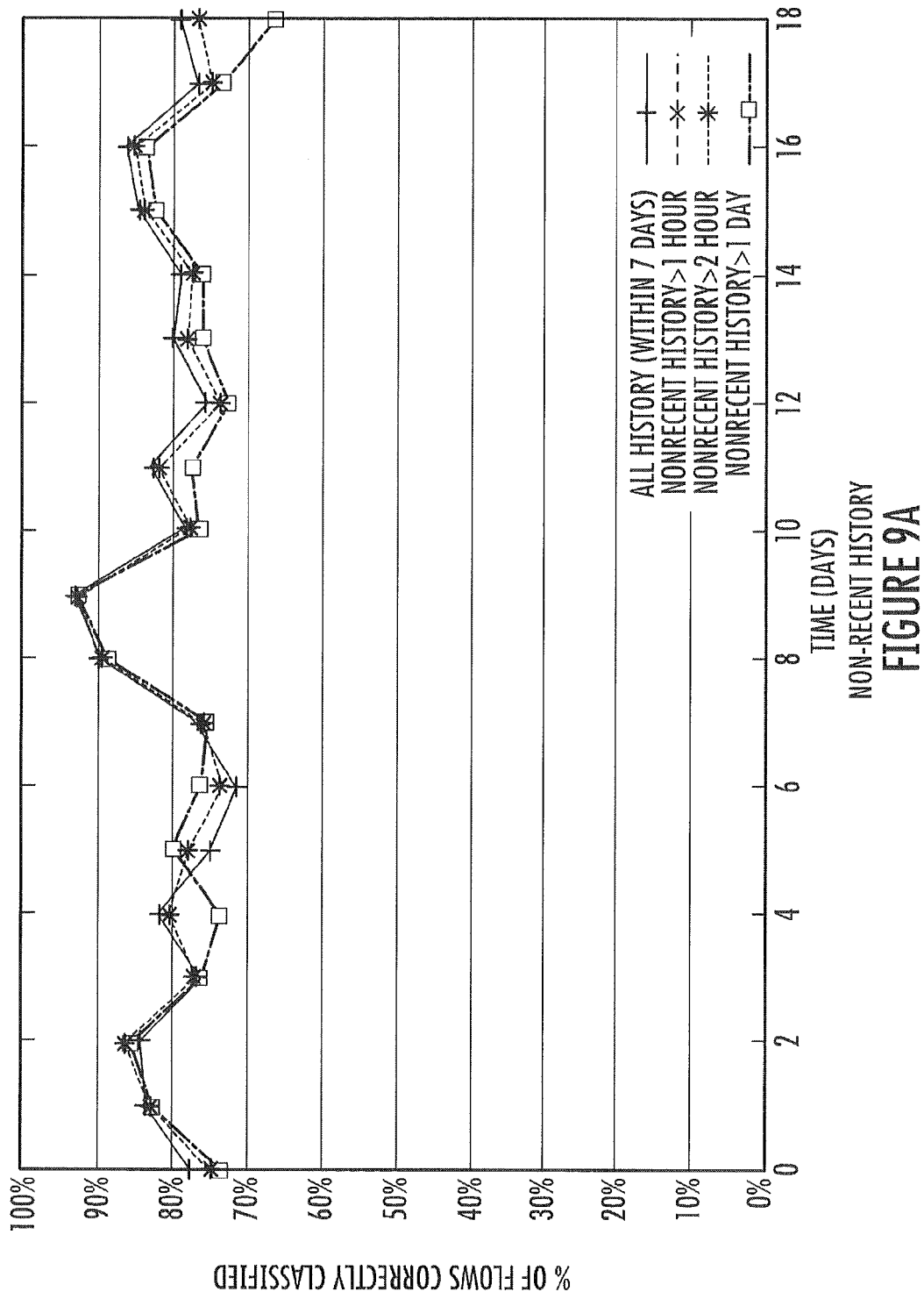

On the packet count heuristic, the threshold was varied to one and to ten packets instead of the 5 that was previously used. Neither of these changes have a significant effect on the accuracy of the good COI created from this heuristic—the number of flows classified correctly changes by less than 1% of flows across the three variations of this heuristic. Variations on the non-recent history and recent history heuristics have more of an effect. Furthermore, to the usual one hour of history, we consider two hours and one day of history for the recent history. Similarly, for nonrecent history seven days of history except for one hour, two hours, and one day. Further, a simplified history heuristic, consisting of the full seven days without anything removed may be considered. Results from these variations are illustrated in FIG. 9.

For the variations of the non-recent history heuristic, there is no clear best variation. In some parts of the data, the simplified history heuristic just using the entire 7 days of history seems best, while in others taking out the first one or two hours seems best. The variations with one or two hours removed perform very similarly to each other. The one thing that is clear is the variation which removes a whole day of the history almost always performs the worst. The situation is clearer for the recent history heuristic. Considering greater lengths of time for this heuristic clearly improves the accuracy of the COI based on it. There is still, however, a trade-off to consider. While seven days of history may be used, this requires maintaining an additional seven days of Netflow. While using only one day of history in the heuristic does not produce the same accuracy, it is not too far off, only by 3.5% of flows at most, and often only by less than 2% of flows.

Performance of the heuristics discussed above are individual performances. Now combinations of heuristics will be evaluated to determine if the combinations produce better results than individual ones. There are two possible methods of combination, add a /24 to the good COI if it meets either one of the heuristics (logical OR), or add it to the good COI only if it meets both of the heuristics (logical AND).

Figure 10:
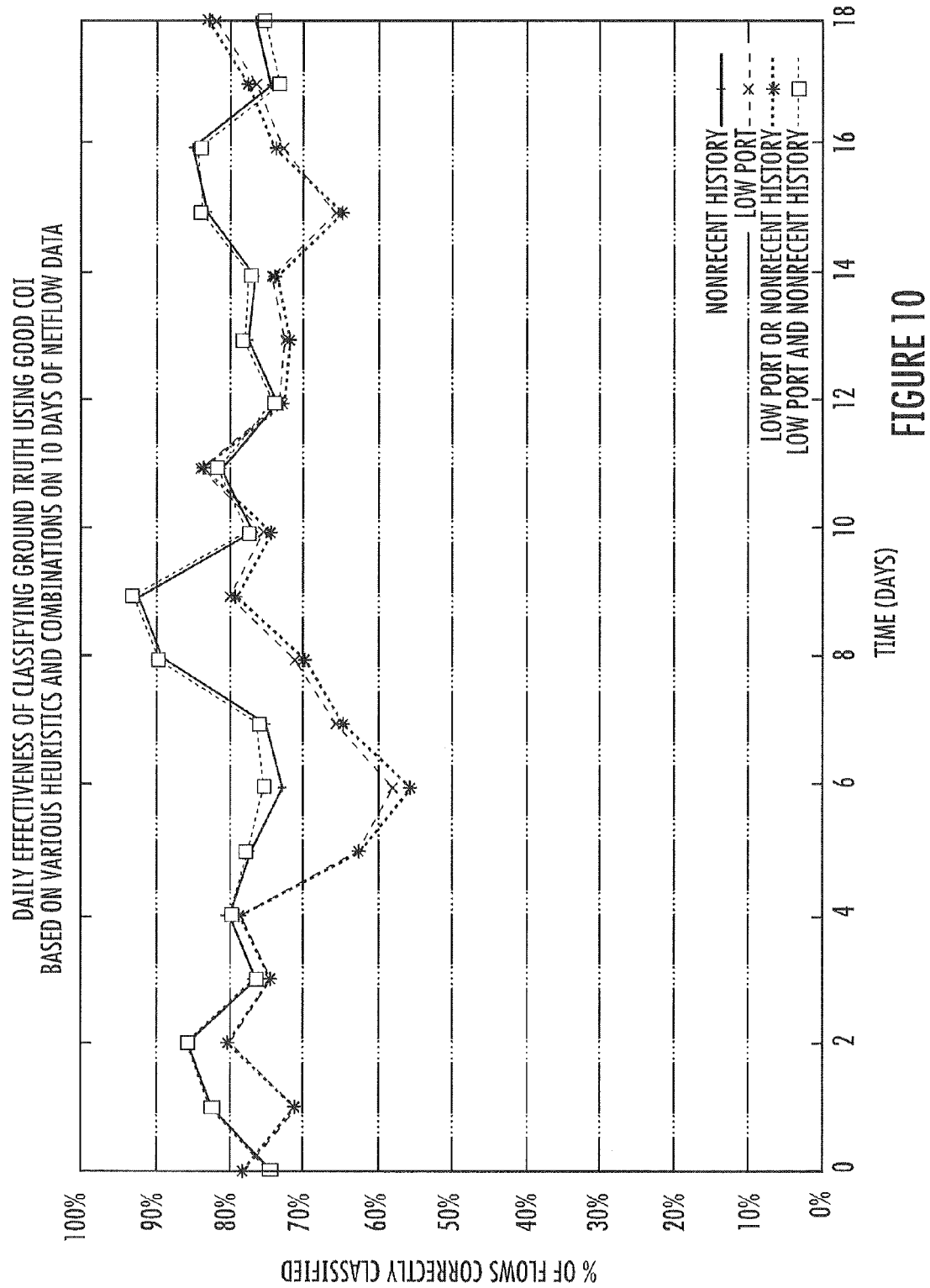
FIG. 10 is a graph illustrating effect of combining heuristics on accuracy of good COI using 10 days of Netflow in accordance with some embodiments.

Both methods of combination for a pair of heuristics will be discussed herein. In the interest of brevity, only the combinations that performed the best will be discussed. First, the non-recent history heuristic is generally the best performing heuristic. The non-recent history heuristic is combined with the low port heuristic, because out of all that perform well, it is the least similar to the non-recent history, both in terms of what it does, and in terms of the pattern of how its accuracy varies over time. Results of the combination of the non-recent history heuristic and the low port heuristic are illustrated in FIG. 10. Overall, combining the heuristics does not seem to gain much. Adding to the good COI if the flow meets one of the heuristics performs nearly the same as the low port heuristic on its own, occasionally it does worse than the low port on its own, by increasing the false positives. The difference between the amount of flows classified correctly by this combination and the low port heuristic on its own is typically not more than 2.4% of flows and usually far less. Similarly, the combination requiring both heuristics to be met in order to be added to the COI performs very similar to the non-recent history heuristics on its own, with never more than a difference of 2.5% of flows classified correctly.

Figure 11:
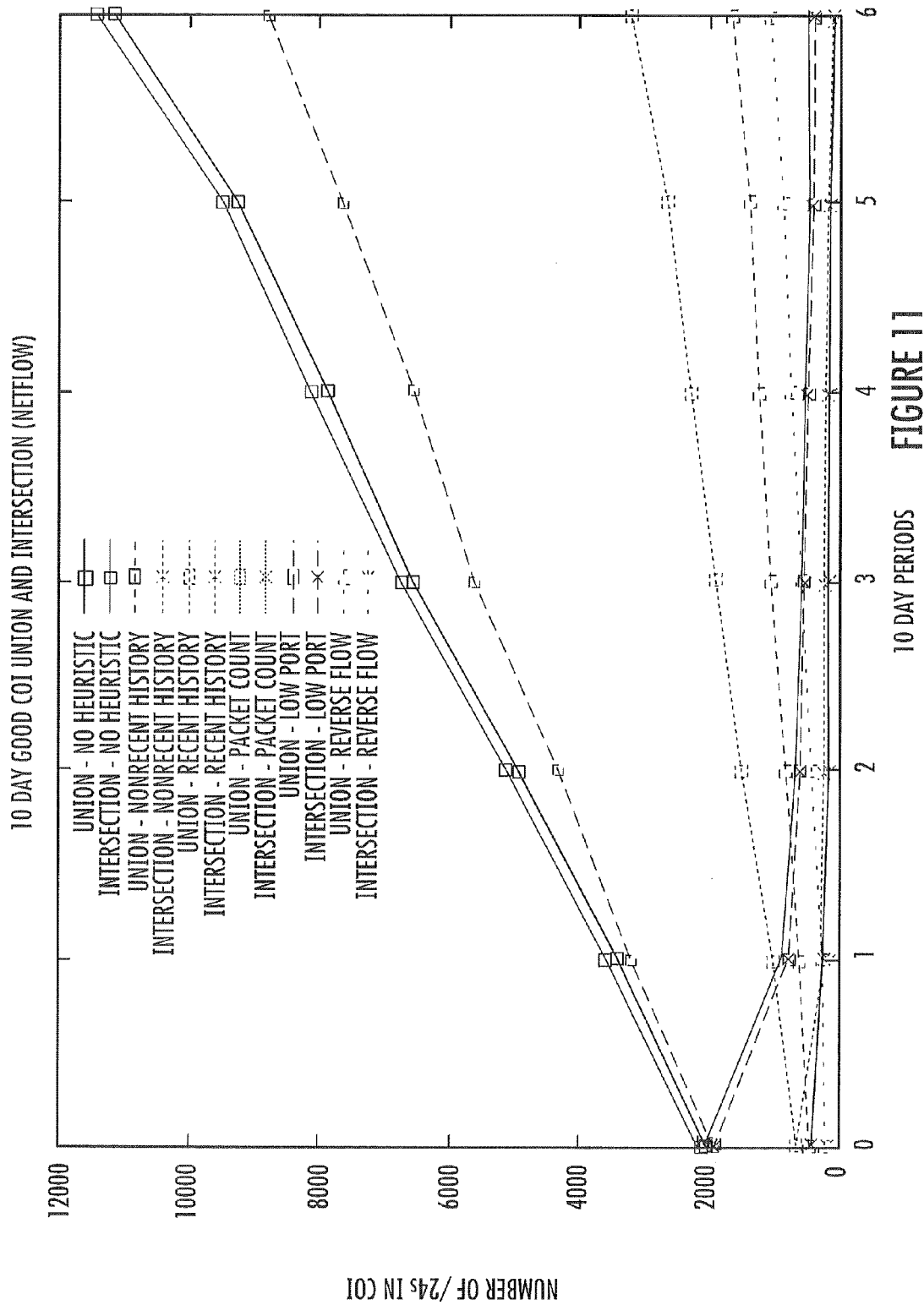
FIG. 11 is a graph illustrating overlap of COIs based on non-overlapping 10 day periods of Netflow in accordance with some embodiments.

Aside from their accuracy, there are other properties that should be included in the good COI, especially since the accuracy received from several of the heuristics are very similar. One other property that should be considered is the size of the good COI. The smaller the COI is, the less space it will take up and the more efficient it will be to apply. Another property is the degree of churn. If the churn is low, it is not as important to regenerate the COI often. FIG. 11 plots the union and intersection of good COIs built using consecutive non-overlapping 10 day periods of Netflow data. As illustrated therein, both properties are represented in each heuristic in this figure. Although their accuracy was in similar ranges, the recent and non-recent history heuristics have fewer entries in the good COI compared to the low port heuristic. While in the first 10 day period considered, the recent and non-recent history heuristics put 651 and 436 /24 s in their good COIs respectively, the low port heuristic more than doubled these with 1905. Furthermore, the difference between the union and intersection for this heuristic grows quickly meaning there is little consistency.

According to some embodiments a history-based approach provides good heuristics for building good COIs from sampled data to classify ground truth. Both the recent history and non-recent history heuristics consistently do a good job of classifying, and also have desirable good COI properties of small size and low churn. Furthermore, a simplified history heuristic, which adds a flow to the COI if the same source was seen in the past seven days, usually classifies slightly better than the two original history heuristics. As discussed above, using ten days of Netflow to build good COIs is enough to provide an accurate result.

Embodiments have been discussed herein with respect to how well the heuristics classify traffic for one customer site. It is difficult to make measurements inside other customer sites and, thus, there may be no way of judging how the heuristics will perform at other customer sites. However, properties which may give an indication of how good a COI would be can be observed. One property important to a COI is consistency in traffic. A good COI classifies traffic based on the information built up from the traffic seen on previous days. A lack of consistency would make the good COI less useful since traffic from previous days would not be able to predict what to expect on the next one. If none of the same entities a site communicated with when building a good COI communicated with it when the COI was used, the COI would be unable to serve its purpose.

Some idea of this property can be determined by building good COIs and testing how much of the overall traffic seen on the next day matches the COI. For this purpose, COIs are built using in excess of 50,000 sites, chosen by selecting the subset of network egress points which are the eventual destinations for traffic observed at a single router on a single day. Note that the results from this process are not directly comparable with those discussed above with respect to the individual customer sites since those used ground truth to determine which flows were actually good or bad. The process discussed above can be used to find the percent of all flows matching the good COI built using this method ranges from 8.7% up to 42.5%, and averages 25.7%.

Figure 12:
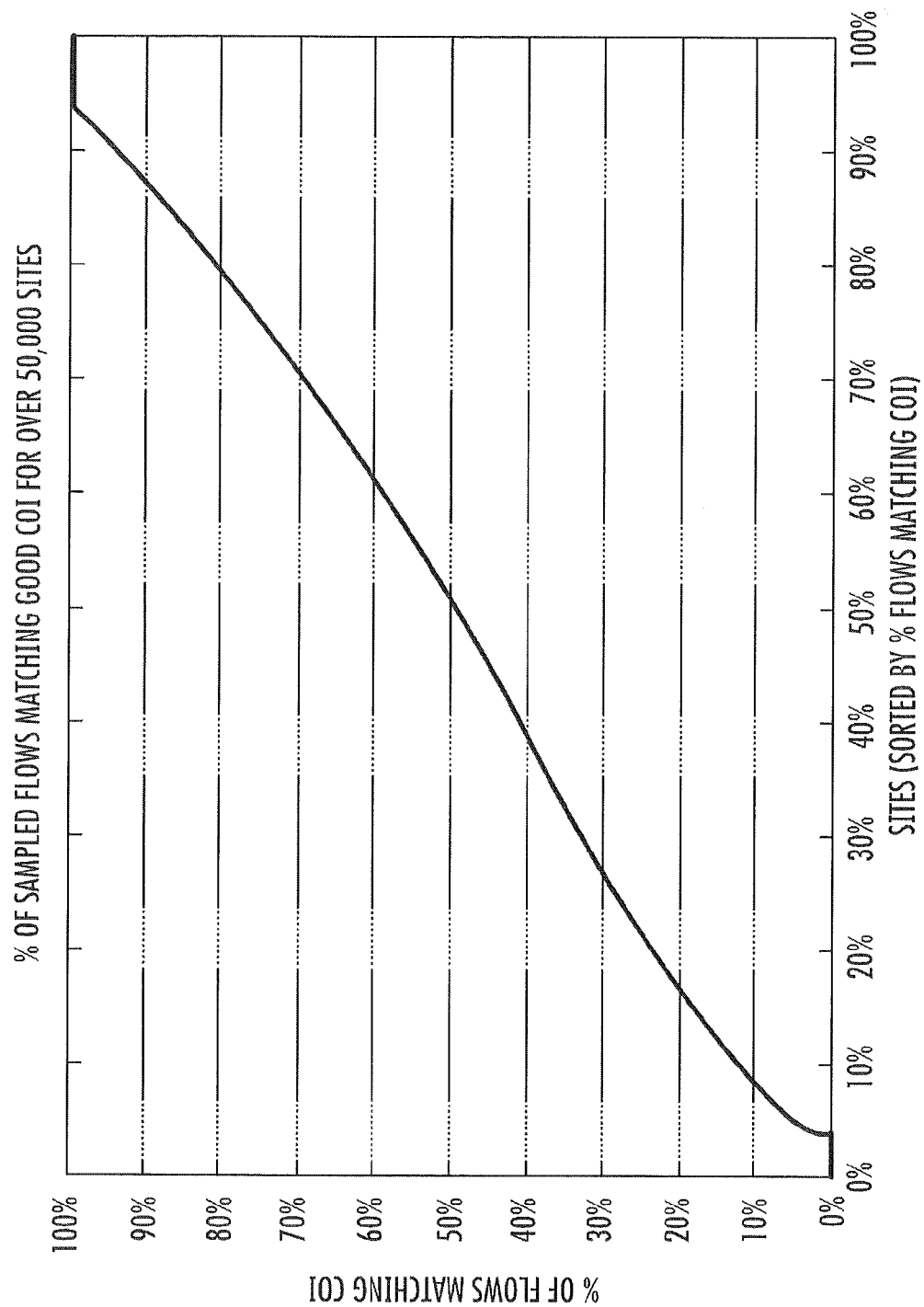
FIG. 12 is a graph illustrating percent of flows matching good COI for over 50,000 sites in accordance with some embodiments.

Referring now to FIG. 12, percent of flows matching good COI for over 50,000 sites will be discussed. As illustrated therein, for each site what percentage of flows seen on the test day matched the good COI for each site is illustrated. A wide variation on how many flows match a good COI for each site is seen. In 6.3% of sites, all of the test data matches the COI and 50% of sites have more than 50% of their flows seen on the testing day in the COI. In 4.0% of sites there is no match between the COI and the flows observed on the testing day.

For these sites, the embodiments described may not be helpful as we do not observe consistency in their traffic.

While it is very likely that a COI would help those with 100% match and not help those with 0% match it is less certain how it would affect those sites in between. The single site averaged 25.7% of flows matching the COI. Across all sites, 78.3% of sites have a higher match with their testing data than the single site averaged. This indicates that while a good COI may not be beneficial to every site, it is likely to be beneficial to a majority of them.

As discussed briefly above with respect to FIGS. 1 through 12, heuristics are a reasonable way to develop good COIs that can aid traffic prioritization decisions at ISPs. Although embodiments were discussed above with respect to one site and extrapolated heuristics for many other sites, embodiments are not limited to a single site.

Figure 13:
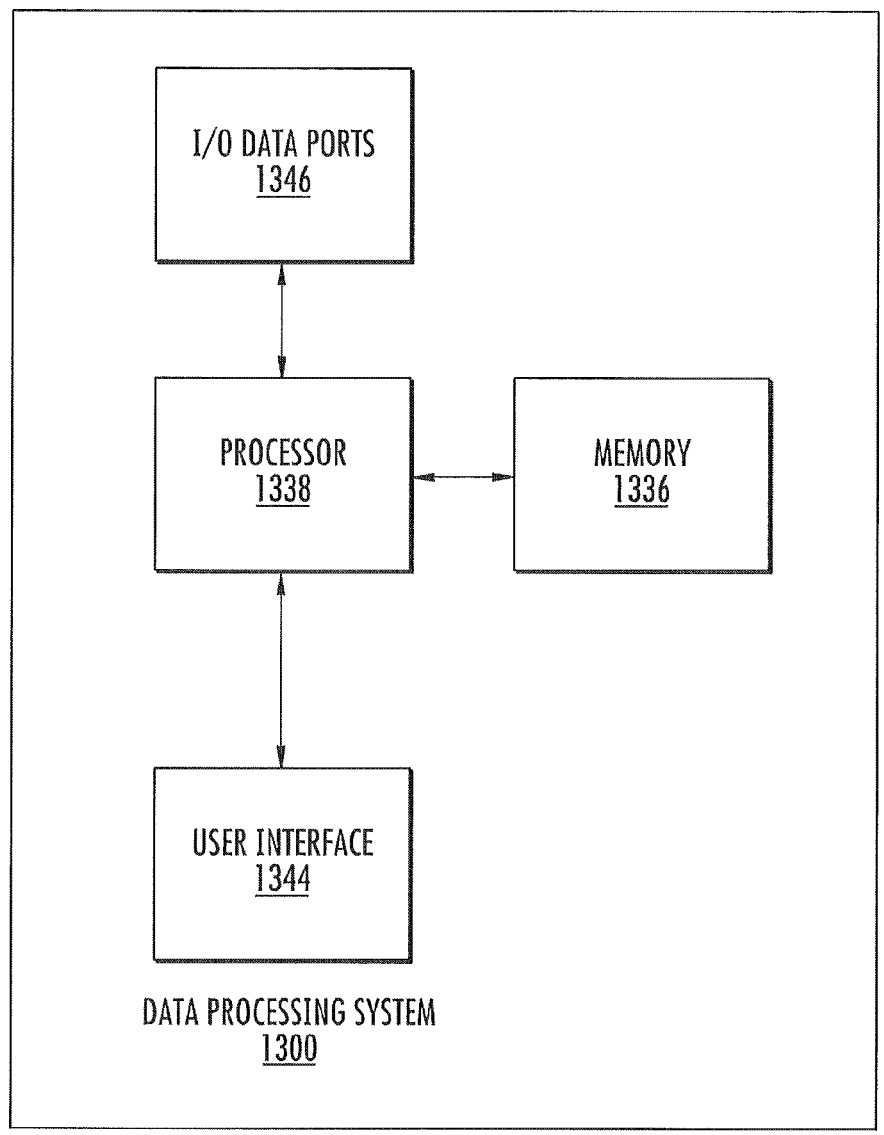
FIG. 13 is a block diagram of a data processing system suitable for use in some embodiments.

Referring now to FIG. 13, a data processing system 1300 in accordance with some embodiments will be discussed. The data processing system 1300 may be used to identify wanted traffic in accordance with some embodiments. As illustrated in FIG. 13, the data processing system 1300 may include a user interface 1344, including, for example, input device(s) such as a keyboard or keypad, a display, a speaker and/or microphone, and a memory 1336 that communicate with a processor 1338. The data processing system 1300 may further include I/O data port(s) 1346 that also communicates with the processor 1338. The I/O data ports 1346 can be used to transfer information between the data processing system 1300 and another computer system or a network, such as the an Internet server, using, for example, an Internet Protocol (IP) connection. These components may be conventional components such as those used in many conventional data processing systems, which may be configured to operate as described herein.

Figure 14:
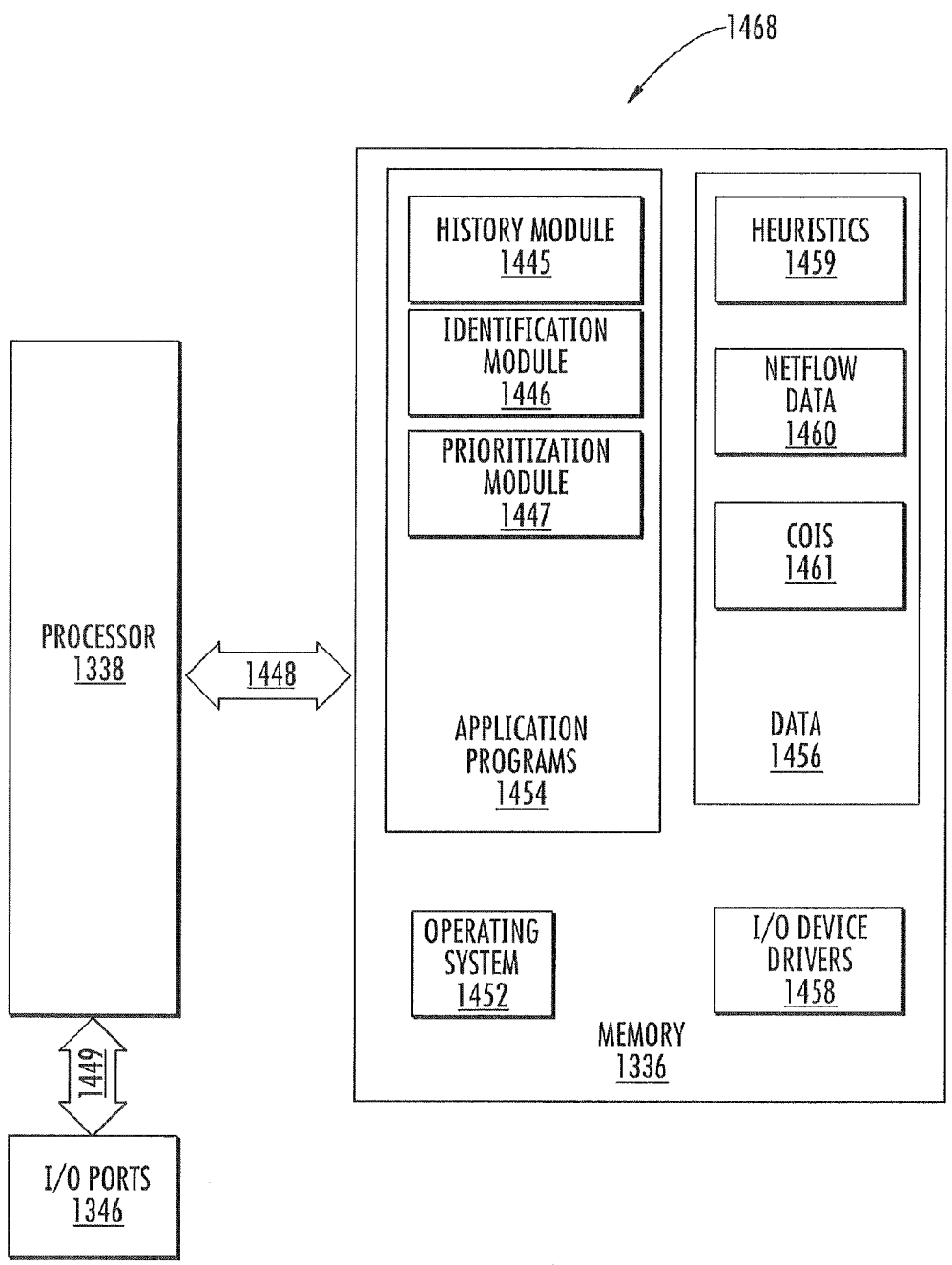
FIG. 14 is a more detailed block diagram of a system according to some embodiments.

Referring now to FIG. 14, a more detailed block diagram of a data processing system 1468 for implementing systems, methods, and computer program products in accordance with some embodiments will now be discussed. It will be understood that the application programs and data discussed with respect to FIG. 14 below may be present in, for example, a server configured to identify wanted traffic in accordance with some embodiments without departing from the scope of embodiments discussed herein.

As illustrated in FIG. 14, the processor 1338 communicates with the memory 1336 via an address/data bus 1448 and with the I/O ports 1346 via an address/data bus 1449. The processor 1338 can be any commercially available or custom enterprise, application, personal, pervasive and/or embedded microprocessor, microcontroller, digital signal processor or the like. The memory 1336 may include any memory device containing the software and data used to implement the functionality of the data processing system 1300. The memory 1336 can include, but is not limited to, the following types of devices: ROM, PROM, EPROM, EEPROM, flash memory, SRAM, and DRAM.

As further illustrated in FIG. 14, the memory 1336 may include several categories of software and data used in the system 1468: an operating system 1452; application programs 1454; input/output (I/O) device drivers 1458; and data 1456. As will be appreciated by those of skill in the art, the operating system 1452 may be any operating system suitable for use with a data processing system, such as OS/2, AIX or zOS from International Business Machines Corporation, Armonk, N.Y., Windows95, Windows98, Windows2000 or WindowsXP, Windows Vista, Windows7 or Windows CE from Microsoft Corporation, Redmond, Wash., Palm OS, Symbian OS, Cisco IOS, VxWorks, Unix or Linux. The I/O device drivers 1458 typically include software routines accessed through the operating system 1452 by the application programs 1454 to communicate with devices such as the I/O data port(s) 1346 and certain memory 1336 components. The application programs 1454 are illustrative of the programs that implement the various features of the system 1468 and may include at least one application that supports operations according to embodiments. Finally, as illustrated, the data 1456 may include heuristics 1459, Netflow data 1460 and COIs 1461, which may represent the static and dynamic data used by the application programs 1454, the operating system 1452, the I/O device drivers 1458, and other software programs that may reside in the memory 1336.

As further illustrated in FIG. 14, according to some embodiments, the application programs 1454 include a history module 1445, an identification module 1446 and a prioritization module 1447. While the present invention is illustrated with reference to the history module 1445, the identification module 1446 and the prioritization module 1447 being application programs in FIG. 14, as will be appreciated by those of skill in the art, other configurations fall within the scope of embodiments discussed herein. For example, rather than being application programs 1454, these circuits or modules may also be incorporated into the operating system 1452 or other such logical division of the system 1468. Furthermore, while the history module 1445, the identification module 1446 and the prioritization module 1447 are illustrated in a single system 1468, as will be appreciated by those of skill in the art, such functionality may be distributed across one or more systems. Thus, the embodiments discussed herein should not be construed as limited to the configuration illustrated in FIG. 14, but may be provided by other arrangements and/or divisions of functions between data processing systems. For example, although FIG. 14 is illustrated as having various circuits/modules, one or more of these circuits/modules may be combined without departing from the scope of embodiments discussed herein.

The history module 1445 is configured to determine a traffic history for a user of the Internet. The identification module 1446 is configured to identify wanted traffic in a stream of Internet traffic based on the determined traffic history. The prioritization module 1447 is configured to prioritize the identified wanted traffic such that unwanted traffic is assigned a lower priority than the wanted traffic.

As discussed in detail above with respect to FIGS. 1 through 12, the history module 1445 may be further configured to obtain historical information, for example, NetFlow data 1460, from an internet service provider (ISP) about the user. A community of interest (COI) 1461 is constructed for the user from the obtained historical information about the user. As discussed above, at least one heuristic is defined. The defined at least one heuristic may include a low port number heuristic, a low packet count heuristic, a reverse flow seen heuristic, a recent history heuristic, a non-recent history heuristic and/or no heuristic as discussed in detail above. In some embodiments, the defined heuristic may be a combination of two or more heuristics. Flows in the stream of internet traffic that represent wanted traffic are identified based on the defined one or more heuristic. The COI for the user is modified to include the endpoints of the flows determined to include wanted traffic.

Figure 15:
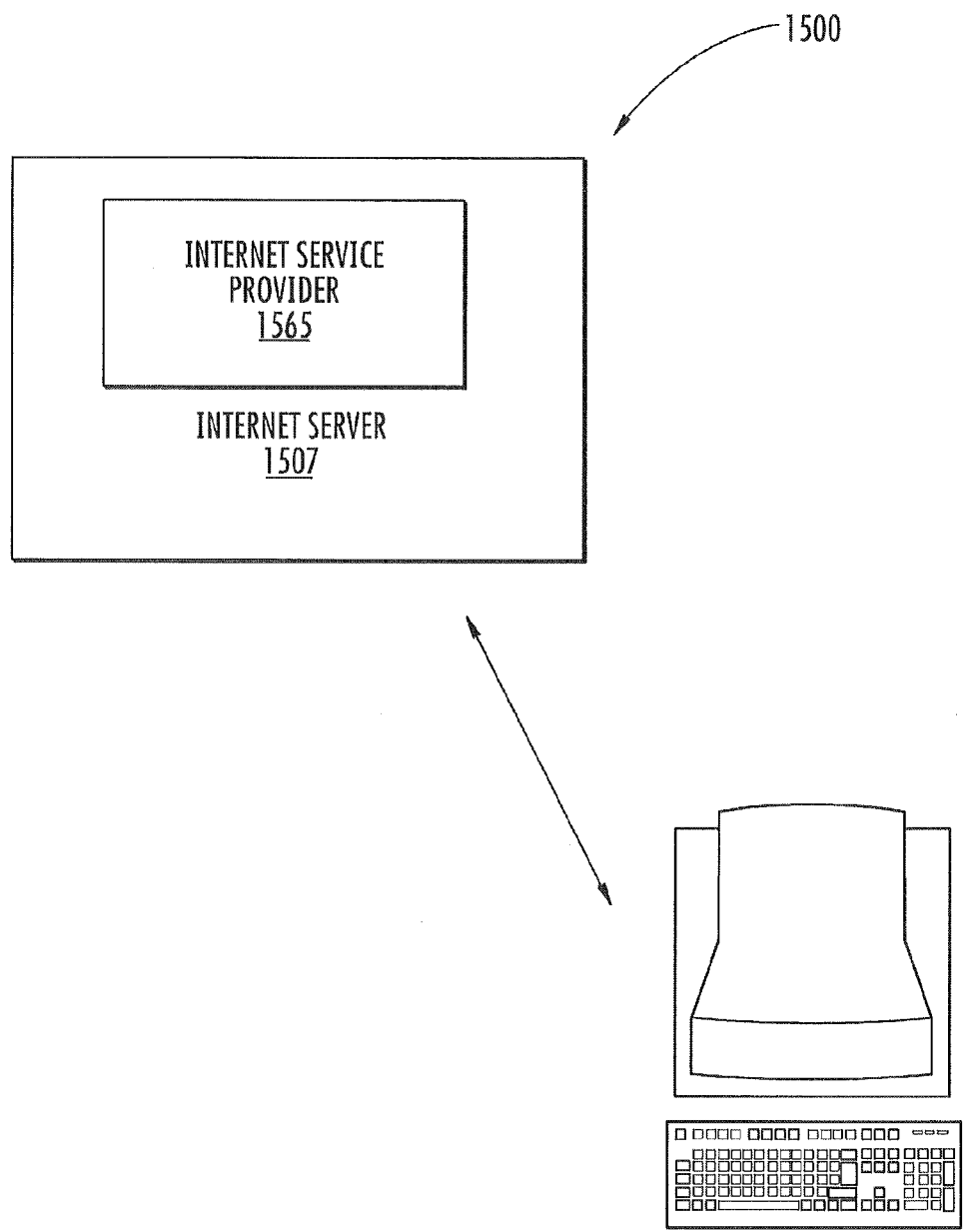
FIG. 15 is a block diagram illustrating a system including an Internet server according to some embodiments.

Referring now to FIG. 15, a system 1500 in accordance with some embodiments will be discussed. As illustrated in FIG. 15, the system 1500 may include an Internet server 1507 associated with at least one internet service provider (ISP) 1565 and at least one communications device, such as a desktop computer 1580. It will be understood that the desktop computer 1580 may include the entire data processing system 1468 discussed with respect to FIG. 14 or may be distributed between the desktop computer 1580 and the server 1507 without departing from the scope of embodiments discussed herein.

The communications device, for example, desk top computer 1580, can be any type of communications device capable of communicating with the Internet server 1507 over a wired or wireless connection. Although only a single communication device is illustrated in FIG. 15, embodiments are not limited to this configuration. For example, more than one communication device may be present without departing from the scope of embodiments discussed herein.

If the communications device is a portable electronic device, as used herein "portable electronic device" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver.

Referring now to FIG. 15, a user may access the Internet 1507 using desktop computer 1580. The user's use of the Internet may establish a history, for example, which sites the user visited, which pop up advertisements the user responded to and the like. In accordance with some embodiments discussed herein, this historical information can be used to identify which Internet data is wanted and unwanted as discussed in detail above. As illustrated in FIG. 3, the Internet server 1507 is associated with at least one ISP 1565. Embodiments discussed herein utilize information collected by the ISP, for example, sampled Netflow data, to determine which flows of data represent wanted traffic and which represent unwanted traffic.

Operations in accordance with various embodiments will now be discussed with respect to FIGS. 16 and 17. Referring first to FIG. 17, operations for identifying wanted traffic on the Internet begins at block 1600 by determining a traffic history for a user of the Internet. Wanted traffic in a stream of Internet traffic is identified based on the determined traffic history (block 1630). The identified wanted traffic is prioritized such that unwanted traffic is assigned a lower priority than the wanted traffic (block 1660).

Referring now to FIG. 17, operations begin at block 1705 by obtaining historical information from an internet service provider (ISP) about the user. The historical information may be, for example, Netflow data. A community of interest (COI) may be constructed for the user from the obtained historical information about the user (block 1715). At least one heuristic is defined (block 1725). The defined at least one heuristic may be a low port number heuristic, a low packet count heuristic, a reverse flow seen heuristic, a recent history heuristic, a non-recent history heuristic and/or no heuristic. In some embodiments, the defined at least one heuristic is a combination of at least two heuristics. Flows in the stream of internet traffic may be identified that represent wanted traffic using the at least one defined heuristic (block 1735). The COI for the user may be modified to include the endpoints of the flows determined to include wanted traffic (block 1745).

Figure 16:
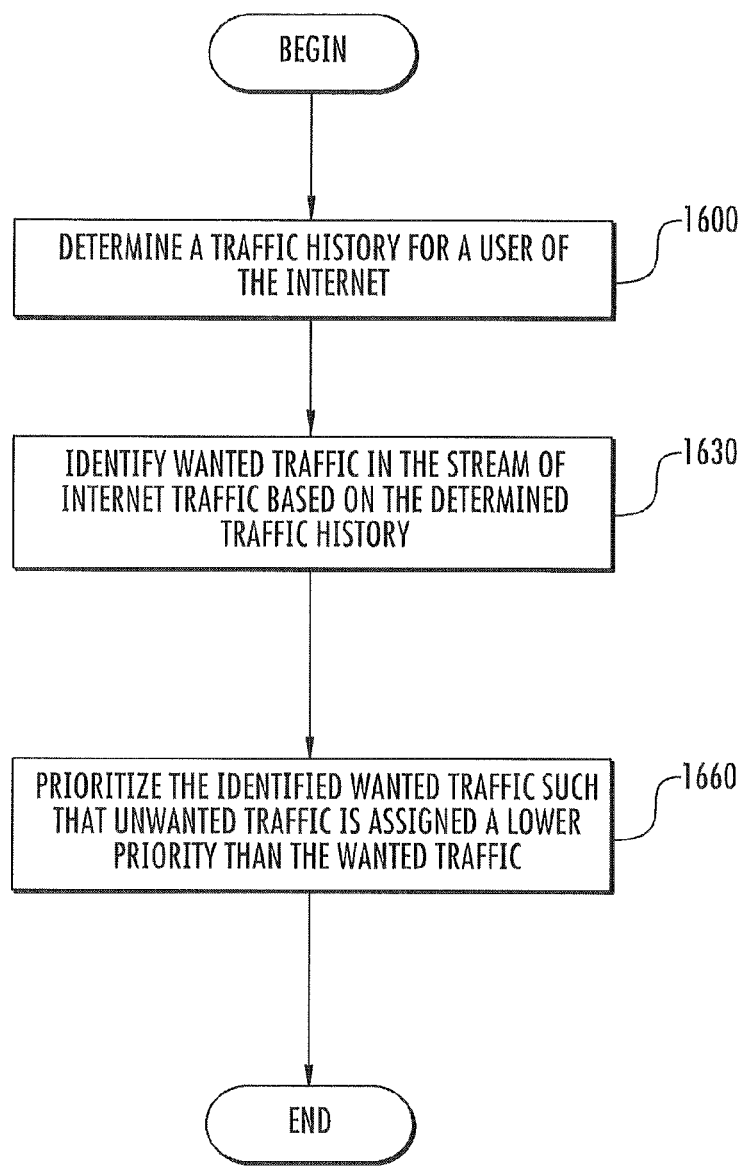
FIGS. 16 and 17 are flowcharts illustrating operations according to various embodiments.
Figure 17:
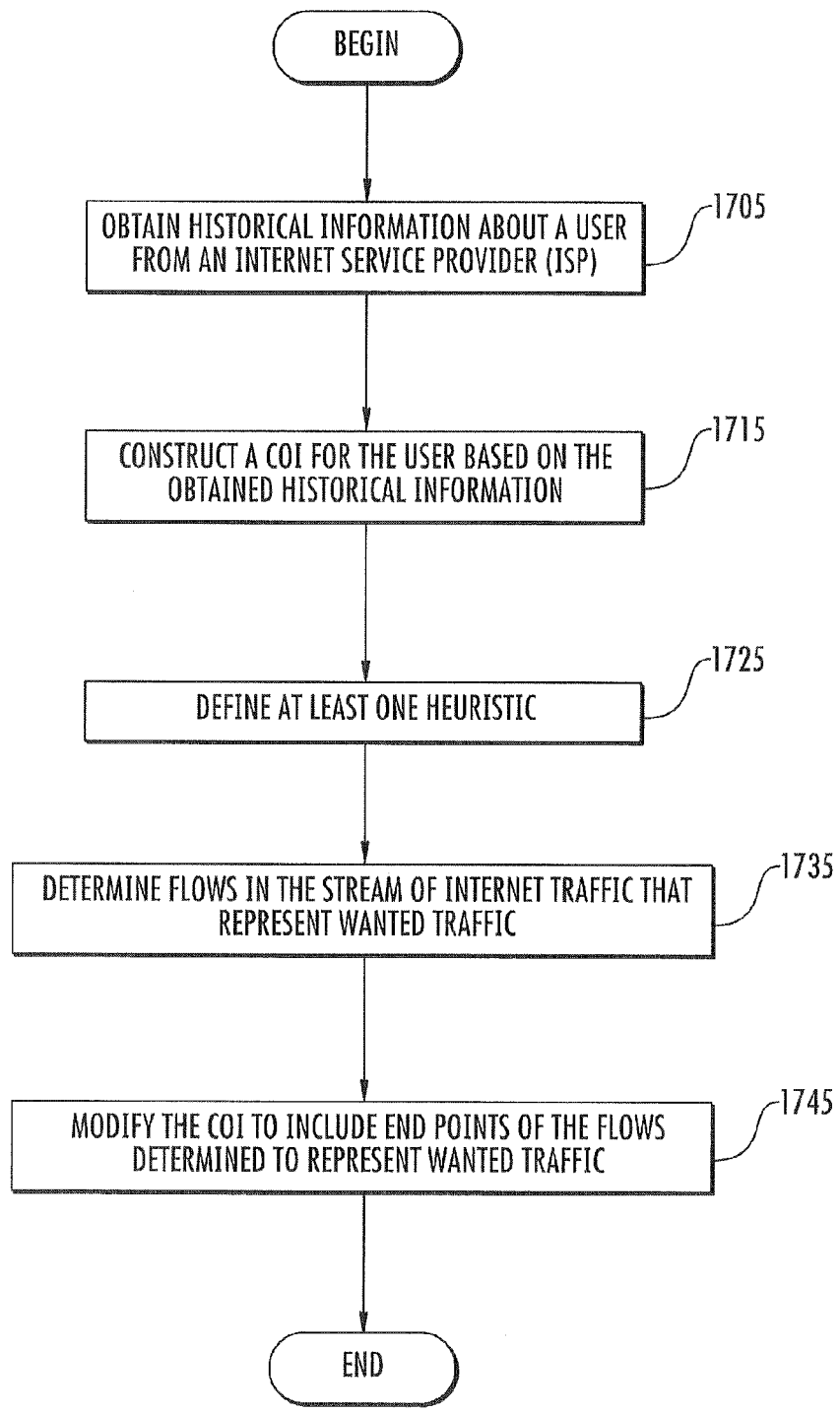

The flowcharts of FIGS. 16 and 17 illustrate the architecture, functionality, and operations of embodiments of methods, systems, and/or computer program products for identifying wanted traffic on the Internet. In this regard, each block represents a module, segment, or portion of code, which comprises one or more executable instructions for implementing the specified logical function(s). It should also be noted that in other implementations, the function(s) noted in the blocks may occur out of the order noted in FIGS. 16 and 17. For example, two blocks shown in succession may, in fact, be executed substantially concurrently or the blocks may sometimes be executed in the reverse order, depending on the functionality involved.

Many variations and modifications can be made to the embodiments without substantially departing from the principles of embodiments discussed herein. All such variations and modifications are intended to be included herein within the scope of embodiments discussed herein, as set forth in the following claims.

That which is claimed:

1. A method for identifying wanted traffic on the internet, comprising:
    determining a traffic history for a user of the internet;
    identifying wanted traffic in a stream of internet traffic based on the traffic history;
    prioritizing the wanted traffic such that unwanted traffic is assigned a lower priority than the wanted traffic, and
    defining a heuristic, wherein identifying and prioritizing are performed based on the heuristic and wherein the heuristic comprises:
    a low port number heuristic that defines traffic in the stream of internet traffic as wanted traffic if any port numbers involved in a connection are below 1024;
    a low packet count heuristic that defines traffic in the stream of internet traffic as wanted traffic if five or fewer packets are seen in a flow; and
    a reverse flow seen heuristic that defines traffic in the stream of internet traffic as wanted traffic if a flow has been seen between a same pair of IP addresses in an opposite direction within a previous seven day period,
    wherein determining, identifying, prioritizing and defining are performed by at least one processor.

2. The method of claim 1, wherein determining a traffic history comprises:
    obtaining historical information from an internet service provider about the user; and
    constructing a community of interest for the user from the historical information about the user.

3. The method of claim 2, wherein the historical information from the internet service provider comprises Netflow data.

4. The method of claim 2, wherein constructing a community of interest comprises:
    determining flows in the stream of internet traffic that represent wanted traffic using the heuristic; and
    modifying the community of interest for the user to include endpoints of the flows including wanted traffic.

5. The method of claim 4, wherein the stream of internet traffic comprises sampled Netflow data and unsampled data.

6. A data processing system for identifying wanted traffic on the internet, comprising:
    a processor, the processor comprising:
    a history module to determine a traffic history for a user of the internet;
    an identification module to identify wanted traffic in a stream of internet traffic based on the traffic history; and
    a prioritization module to prioritize the identified traffic such that unwanted traffic is assigned a lower priority than the wanted traffic, wherein the history module further defines a heuristic, wherein the heuristic comprises:

a low port number heuristic that defines traffic in the stream of internet traffic as wanted traffic if any port numbers involved in a connection are below 1024;

a low packet count heuristic that defines traffic in the stream of internet traffic as wanted traffic if five or fewer packets are seen in a flow; and a reverse flow seen heuristic that defines traffic in the stream of internet traffic as wanted traffic if a flow has been seen between a same pair of IP addresses in an opposite direction within a previous seven day period, wherein the identification module identifies and the prioritization module prioritizes based on the heuristic.

7. The system of claim 6, wherein the history module is further to:

obtain historical information from an internet service provider about the user; and construct a community of interest for the user from the historical information about the user.

8. The system of claim 6, wherein the historical information from the internet service provider comprises Netflow data.

9. The system of claim 6, wherein the history module is further to:

determine flows in the stream of internet traffic that represent wanted traffic using the heuristic; and modify the community of interest for the user to include endpoints of the flows including wanted traffic.

10. A computer program product for identifying wanted traffic on the internet, comprising:

a non-transitory computer readable storage medium having computer readable program code embodied therein, the computer readable program code comprising:

computer readable program code to determine a traffic history for a user of the internet;

computer readable program code to identify wanted traffic in a stream of internet traffic based on the traffic history;

computer readable program code to prioritize the wanted traffic such that unwanted traffic is assigned a lower priority than the wanted traffic; and computer readable program code to define a heuristic, wherein the computer program code to identify and the computer program code to prioritize are performed based on the heuristic and wherein the heuristic comprises:

a low port number heuristic that defines traffic in the stream of internet traffic as wanted traffic if any port numbers involved in a connection are below 1024;

a low packet count heuristic that defines traffic in the stream of internet traffic as wanted traffic if five or fewer packets are seen in a flow; and a reverse flow seen heuristic that defines traffic in the stream of internet traffic as wanted traffic if a flow has been seen between a same pair of IP addresses in an opposite direction within a previous seven day period.

11. The computer program product of claim 10, wherein the computer readable program code to determine a traffic history comprises:

computer readable program code configure to obtain historical information from an internet service provider about the user; and computer readable program code to construct a community of interest for the user from the historical information about the user.

12. The computer program product of claim 11, wherein the historical information from the internet service provider comprises Netflow data.

13. The computer program product of claim 11, wherein the computer readable program code to construct a community of interest comprises:

computer readable program code to determine flows in the stream of internet traffic that represent wanted traffic using the heuristic; and computer readable program code to modify the community of interest for the user to include endpoints of the flows including wanted traffic.

14. The computer program product of claim 13, wherein the stream of internet traffic comprises sampled Netflow data and unsampled data.

\* \* \* \* \*